US008868923B1

(12) United States Patent
Hamlet et al.

(10) Patent No.: US 8,868,923 B1
(45) Date of Patent: Oct. 21, 2014

(54) MULTI-FACTOR AUTHENTICATION

(75) Inventors: Jason R. Hamlet, Albuquerque, NM (US); Lyndon G. Pierson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 566 days.

(21) Appl. No.: 12/908,414

(22) Filed: Oct. 20, 2010

Related U.S. Application Data

(63) Continuation-in-part of application No. 12/844,860, filed on Jul. 28, 2010.

(51) Int. Cl.
| | | |
|---|---|---|
| *G06F 21/00* | (2013.01) | |
| *G06F 21/32* | (2013.01) | |
| *G05B 19/00* | (2006.01) | |
| *H04L 9/00* | (2006.01) | |
| *H04L 9/32* | (2006.01) | |
| *H04L 29/06* | (2006.01) | |
| *H04N 1/44* | (2006.01) | |
| *H04N 21/4415* | (2011.01) | |
| *H03K 19/003* | (2006.01) | |
| *H04W 12/06* | (2009.01) | |

(52) U.S. Cl.
CPC ............... *G06F 21/00* (2013.01); *G06F 21/32* (2013.01); *G05B 19/00* (2013.01); *H04L 9/00* (2013.01); *H04L 9/3278* (2013.01); *H04L 9/3231* (2013.01); *H04L 63/0861* (2013.01); *H04L 29/06809* (2013.01); *H04N 1/442* (2013.01); *H04N 21/4415* (2013.01); *H03K 19/003* (2013.01); *H04W 12/06* (2013.01)
USPC ........... 713/186; 380/44; 340/5.83; 340/5.53; 326/8

(58) Field of Classification Search
CPC ......... G06F 21/00; G06F 21/32; G05B 19/00; H04L 9/00; H04L 9/3278
USPC .................................. 713/186; 326/8; 380/44
See application file for complete search history.

(56) References Cited

U.S. PATENT DOCUMENTS

| | | | | |
|---|---|---|---|---|
| 6,584,214 | B1 * | 6/2003 | Pappu et al. .................. | 382/108 |
| 7,370,190 | B2 | 5/2008 | Calhoon et al. | |
| 7,681,103 | B2 | 3/2010 | Devadas et al. | |
| 8,290,150 | B2 * | 10/2012 | Erhart et al. .................... | 380/44 |
| 2002/0073310 | A1 * | 6/2002 | Benantar ....................... | 713/156 |

(Continued)

OTHER PUBLICATIONS

Frikken et al., "Robust Authentication Using Physically Unclonable Functions", 2009.*

(Continued)

*Primary Examiner* — Ondrej Vostal
(74) *Attorney, Agent, or Firm* — Cory G. Claassen

(57) ABSTRACT

Detection and deterrence of spoofing of user authentication may be achieved by including a cryptographic fingerprint unit within a hardware device for authenticating a user of the hardware device. The cryptographic fingerprint unit includes an internal physically unclonable function ("PUF") circuit disposed in or on the hardware device, which generates a PUF value. Combining logic is coupled to receive the PUF value, combines the PUF value with one or more other authentication factors to generate a multi-factor authentication value. A key generator is coupled to generate a private key and a public key based on the multi-factor authentication value while a decryptor is coupled to receive an authentication challenge posed to the hardware device and encrypted with the public key and coupled to output a response to the authentication challenge decrypted with the private key.

28 Claims, 8 Drawing Sheets

(56) References Cited

U.S. PATENT DOCUMENTS

| | | | |
|---|---|---|---|
| 2003/0204743 A1 | 10/2003 | Devadas et al. | |
| 2006/0209584 A1* | 9/2006 | Devadas et al. | 365/52 |
| 2006/0210082 A1 | 9/2006 | Devadas et al. | |
| 2006/0221686 A1 | 10/2006 | Devadas et al. | |
| 2006/0271792 A1 | 11/2006 | Devadas et al. | |
| 2006/0271793 A1 | 11/2006 | Devadas et al. | |
| 2007/0038871 A1* | 2/2007 | Kahlman et al. | 713/193 |
| 2007/0044139 A1 | 2/2007 | Tuyls et al. | |
| 2007/0125857 A1* | 6/2007 | Tuyls et al. | 235/454 |
| 2007/0183194 A1 | 8/2007 | Devadas et al. | |
| 2008/0044027 A1 | 2/2008 | Van Dijk | |
| 2008/0059809 A1 | 3/2008 | Van Dijk | |
| 2008/0141364 A1* | 6/2008 | Skoric et al. | 726/20 |
| 2008/0231418 A1* | 9/2008 | Ophey et al. | 340/5.85 |
| 2009/0083833 A1* | 3/2009 | Ziola et al. | 726/2 |
| 2009/0254981 A1 | 10/2009 | Devadas et al. | |
| 2009/0326840 A1* | 12/2009 | Gebara et al. | 702/57 |
| 2010/0031065 A1* | 2/2010 | Futa et al. | 713/194 |
| 2010/0083000 A1* | 4/2010 | Kesanupalli | 713/186 |
| 2010/0127822 A1* | 5/2010 | Devadas | 340/5.8 |
| 2010/0177898 A1* | 7/2010 | Tuyls et al. | 380/270 |
| 2010/0272255 A1* | 10/2010 | Devadas et al. | 380/44 |
| 2011/0002461 A1* | 1/2011 | Erhart et al. | 380/44 |
| 2011/0050279 A1* | 3/2011 | Koushanfar et al. | 326/8 |
| 2011/0066670 A1* | 3/2011 | Yu | 708/252 |
| 2011/0191837 A1* | 8/2011 | Guajardo Merchan et al. | 726/6 |
| 2013/0051552 A1* | 2/2013 | Handschuh et al. | 380/44 |

OTHER PUBLICATIONS

Bertine et al., "Location-Aware Authentication and Access Control—Concepts and Issues", 2009.*

Mitrokotsa et al., "Classifying RFID attacks and defenses", 2009.*

Guajardo et al., "Anti-counterfeiting, key distribution, and key storage in an ambient world via physical unclonable functions", 2009.*

Petkovic, "Remote Patient Monitoring: Information Reliability Challenges", 2009.*

Asim et al., "Physically Unclonable Functions and Their Applications to Vehicle System Security", 2009.* van der Leest et al., "Hardware Intrinsic Security from D flip-flops", 2010.*

Dodis et al., "Fuzzy Extractors: How to Generate Strong Keys for Biometrics and Other Noisy Data", 2004.*

Maes et al., "Physically Unclonable Functions: A Study on the State of the Art and Future Research Directions", 2010.*

Tuyls et al., "Strong Authentication with Physical Unclonable Functions", 2007.*

Yu et al., "Secure and Robust Error Correction for Physical Unclonable Functions", 2009.*

Ignatenko et al., "Estimating the Secrecy-Rate of Physical Unclonable Functions with the Context-Tree Weighting Method", 2006.*

Hao et al., "Combining Crypto with Biometrics Effectively", 2006.*

Mukherjee et al., "Amlware Hardware Technology Drivers of Ambient Intelligence", 2006.*

Yu, "Combination or Values from a Pseudo-Random Source", U.S. Appl. No. 61/231,417 specification, 2009.*

Yu et al., "Recombination of Physcial Unclonable Functions", 2010.*

Verbitskiy et al., "Reliable Biometric Authentication with Privacy Protection", 2003.*

Su, Ying et al., "A Digital 1.6 pJ/bit Chip Identification Circuit Using Process Variations", IEEE Journal of Solid-State Circuits, Jan. 2008, pp. 69-77, vol. 43, No. 1.

Lee, Jae W. et al., "A Technique to Build a Secret Key in integrated Circuits for Identification and Authentication Applications; Computation Structures Group Memo 472", 2004, 6 pages, Massachusetts Institute of Technology, Computer Science and Artificial Intelligence Laboratory.

Kaps, Jens-Peter et al., "Energy Scalable Universal Hashing", IEEE Transactions on Computers, Dec. 2005, pp. 1484-1495; vol. 54, No. 12.

Kumar, Sandeep S. et al., "Extended Abstract: The Butterfly PUF Protecting IP on every FPGA", Proceedings of the 2008 IEEE International Workshop on Hardware-Oriented Security and Trust, 2008, 4 pages.

Guajardo, Jorge et al., "FPGA Intrinsic PUFs and Their Use for IP Protection", Proceedings of the 9th international workshop on Cryptographic Hardware and Embedded Systems, Lecture Notes in Computer Science; vol. 4727, 2007, pp. 63-80.

Dodis, Yevgeniy et al., "Fuzzy Extractors; How to Generate Strong Keys from Biometrics and Other Noisy Data", SIAM Journal on Computing, 2008, 18 pages, vol. 38, Issue 1.

Maes, Roel et al., "Intrinstic PUFs from Flip-flops on Reconfigurable Devices", $3^{rd}$ Benelux Workshop on Information and System Security, Nov. 2008, 17 pages.

Krawczyk, Hugo, "LFSR-based Hashing and Authentication", Advances in Cryptology—CRYPTO '94, LNCS 839, 1994; pp. 129-139.

Suh, Edward G. et al., "Physical Uncionable Functions for Device Authentication and Secret Key Generation", Proceedings of the 44th annual Design Automation Conference, 2007, pp. 9-14.

Guajardo; Jorge et al., "Physical Unclonable Functions and Public-Key Crypto for FPGA IP Protection", 2007, 7 pages, Philips Research Laboratories, Eindhoven, The NetherLands.

Gassend, Blaise et al., "Silicon Physical Random Features, Computation Structures Group Memo 456", In the proceedings of the Computer and Communication Security Conference, Nov. 2002, 15 pages, Massachusetts Institute of Technology, Computer Science and Artificial Intelligence Laboratory.

Tuyls, P. et al., "Secret Key Generation from Classical Physics, Physical Unclonable Functions", 2006, 20 pages, Phillips Research Laboratories, The Netherlands.

Guajardo; Jorge et al., "Physical Unclonabie Functions and Public-Key Crypto for FPGA IP Protection", Sep. 11, 2007, 22 pages, Philips Research Europe, Eindhoven, The Netherlands.

Bauer; Todd et al., "Infrastructure for Nondestructive Real-time Fingerprinting of Integrated Circuits", Laboratory Directed Research and Development Presentation Day, Sep. 14, 2009, 1 page, Sandia National Laboratories, Albuquerque, New Mexico.

Kommerling, Oliver et al., "Design Principles for Tamper-Resistant Smartcard Processors", Proceedings of the USENIX Workshop on Smartcard Technology on USENIX Workshop on Smartcard Technology, May 10-11, 1999, 13 pages, USENIX Association.

ATIS Telecom Glossary 2007, <http://www.atis.org/glossary/definition.aspx?id=3516 >, retrieved from Internet on Sep. 9, 2010, 2 pages.

Roy, Jarrod A. et al, "Protecting Bus-based Hardware IP by Secret Sharing", Proceedings of the 45th Annual Design Automation Conference, 2008, 6 pages, Anaheim, CA.

Kirkpatrick, Michael et al., "Physically Restricted Authentication and Encryption for Cyber-physical Systems", DHS Workshop on Future Directions in Cyber-physical Systems Security, 2009, 5 pages.

* cited by examiner

MULTI-FACTOR AUTHENTICATION

RELATED APPLICATIONS

This application is a continuation-in-part of U.S. patent application Ser. No. 12/844,860, entitled "Deterrence of Device Counterfeiting, Cloning, and Subversion by Substitution Using Hardware Fingerprinting," filed Jul. 27, 2010, the contents of which are hereby incorporated by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to trusted computing, and in particular but not exclusively, relates to multi-factor authentication to protect against spoofing user authentication.

BACKGROUND INFORMATION

Trustworthy computing (with software) cannot exist without trustworthy hardware to build it on. Even if an integrated circuit is produced using rigorous procedures in a "Trusted Foundry" and certified as "trustworthy," technology must be developed to ensure against wholesale replacement of the component with a separately manufactured but subverted "look-alike" after the point of certification. Without detection of subversion by wholesale component substitution, today's information processing systems are vulnerable to sophisticated adversaries that can fabricate "look-alike" components that perform the same function as the intended component but which may contain additional subversion artifices that can be later triggered by an adversary to disrupt or compromise operation.

Using physical system protection schemes to prevent subversive attacks in deployed information processing hardware is technically difficult and expensive. An alternative to resisting subversive attack with physical system protection schemes is to employ robustly authenticated and protected hardware architectures to enable tracing of the origin of these components. Physically Unclonable Function (PUF) technology may be leveraged to detect and deter adversaries from attempting subversion by insertion of subversive functionality and by instantiation of counterfeit components (subversion via substitution). PUFs are derived from the inherently random, physical characteristics of the material, component, or system from which they are sourced, which makes the output of a PUF physically or computationally very difficult to predict. Silicon-based microelectronics appear to be a potentially rich source of PUFs because subtle variations in the production processes result in subtle variations in the physical and operational properties of the fabricated devices. Additionally, each device can have millions of exploitable transistors, circuits, and other active and passive components. Accordingly, PUFs extracted from microelectronics are of keen interest because of their potential applications to cyber security.

Trusted foundry processing of silicon-based microelectronics requires enormous investments to protect against subversion; however, this investment imparts trust only during the fabrication phase of a component's life cycle. Without the equivalent of rigorous two-person control of the component during the deployment phase of its life cycle, it can be difficult to demonstrate authenticity even for components from today's trusted foundries.

In high-assurance authentication systems, it is becoming common practice to combine multiple authentication "factors" to increase the work factor required of an adversary to spoof the authentication. In particular, smart cards are beginning to combine "something you have" with "something you know" (a personal identification number or "PIN"). These authentication devices sometimes also store a digitally signed copy of a "biometric" such as information about a person's characteristic fingerprint in order to facilitate using "something you are" (a biometric) as part of the authentication. These ancillary authentication data are checked in a serial fashion in today's systems. If the correct PIN is entered (something you know), then if the fingerprint is checked to be correct (something you are), then the smart card performs a cryptographic challenge based on "something you have" (a private key stored in the smart card device). However, the conventional authentication systems do not integrally combine "something you have" with "something you know" and/or "something you are" into a single cryptographic authentication challenge. Without this integral binding of "something you have" with "something you know" and/or "something you are" cryptographically into a single challenge, the authentication can be more easily spoofed by subversion (replacement of the device with a similar device that ignores the ancillary authentication data). The subverted device must only extract or deduce the single secret (private key) and complete a simple cryptographic challenge, thus mimicking the last stage of the smart card's authentication process.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
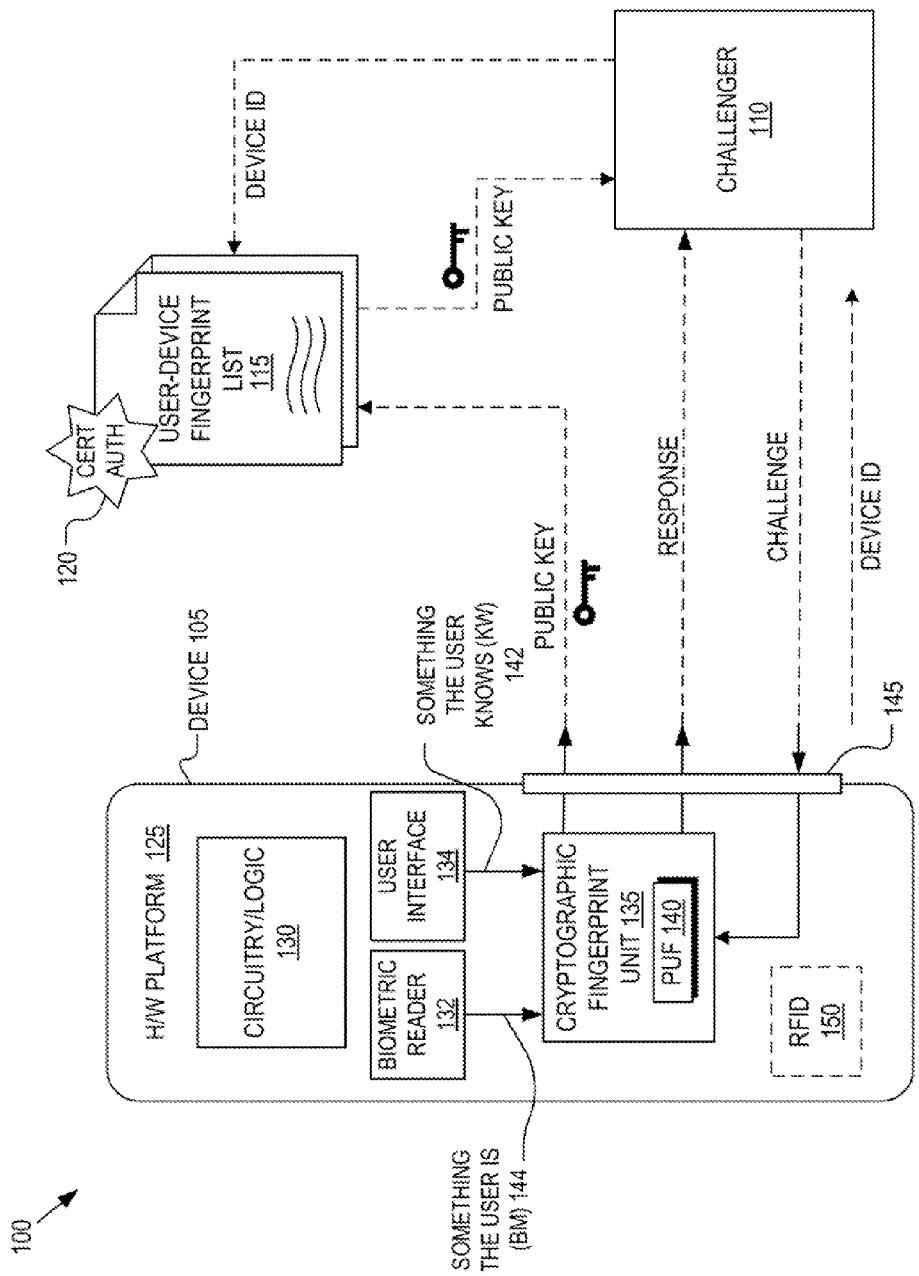
FIG. 1 is a functional block diagram illustrating a fingerprinting infrastructure for authenticating a user of a hardware device, in accordance with an embodiment of the invention.

Embodiments of a system and method for authenticating a user of a hardware device to detect and deter spoofing of the authentication are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In many situations, it may be necessary for users to be authenticated to systems. To name a few, this occurs when individuals wish to use computing resources, for facilities access control, and for transactions with automated teller machines. Embodiments of the present invention augment the trustworthiness of deployed information processing systems by introducing the concept of a unique multi-factor authentication value and a cryptographic challenge/response protocol for authenticating a user of a hardware device to protect against spoofing by another, such as an adversary. Multi-factor authentication is authentication based on a user (also called a requestor or prover) proving identity using at least two independent factors. The three factors are: 1) "Something the user knows" (such as a password or personal identification number (PIN)); 2) "Something the user has" (such as a smart card or passport); and 3) "Something the user is" (such as a biometric including fingerprints or retina scans).

It should be noted that that multi-factor authentication requires independent factors; replicating the proof of one factor, such as requiring the requestor to answer several questions, constituting a repetition of the "something you know factor," is only single factor authentication. As described above, the conventional authentication systems do not integrally combine "something you have" with "something you know" and/or "something you are" into a single cryptographic authentication challenge. However, using the embodiments described herein, the adversary must incorporate the user knowledge (e.g. PIN), the user's biometric, as well as unique characteristics of the original device into a single cryptographic function in order to complete the cryptographic challenge (a much harder task). The single cryptographic authentication challenge is immune to separate sequential subversion of the serial checking of the ancillary factors. Disclosed embodiments leverage Physical Unclonable Function (PUF) technology to enhance the security of challenge-response multi-factor authentication systems. The embodiments described herein may employ PUFs, which can be incorporated into the "something the user has" factor. PUFs are derived from random physical characteristics within the hardware of a device, which makes a PUF output difficult to predict from one device to another. Alternatively, other hardware identifiers may be used as the "something the user has" authentication factor. The multi-factor authentication technique may combine any of the following into a single challenge: 1) "Something the user knows" with "something the user has"; 2) "Something the user is" with "something the user has"; and 3) "Something the user knows" and "something the user is" with "something the user has." Since these factors do not need to be stored in the device, but can be generated when needed (e.g., in real-time), these embodiments minimize the exposure of the secrets required to verify the factors. The multi-factor authentication provides a stronger authentication because an adversary has more work to do to subvert the authentication than for single factor authentication. The multi-factor authentication factor can be used to generate a user-device fingerprint, which can be authenticated at any time during the deployment phase of a component life cycle using a cryptographic challenge/response protocol. The embodiments allow for robust spoofing detection and, as such, form a deterrent to user authentication spoofing.

The embodiments described herein can be used in connection with hardware tokens (e.g., smart cards), but can also be applicable in other scenarios as well. For example, a PUF could be incorporated into a thin client, and then the combination of the PUF and a user's credentials could be used to authenticate to a domain. In this way, the domain ensures that the combination of user and machine is permitted to access the domain. Alternatively, the thin client could require multi-factor authentication from the user, for example, from a smart card and a password. Some function of the smart card's PUF and the user's password could then be securely transferred to the thin client, and then this value could be combined with the thin client's PUF to authenticate the combination of user and thin client to the domain. This constitutes two layers of multi-factor authentication in a single cryptographic authentication challenge.

In current practice, smart cards store secrets on the smart card. The secrets are protected with some tamper-resistant techniques. The embodiments described herein combine multiple authentication factors into a single challenge/response interaction in such a way that the required full secrets may never be stored in non-volatile storage, and exist in conventional volatile circuitry only for the minimum of time required to perform the authentication. This may provide an improvement in robustness against spoofing of the authentication by the adversary because it not only eliminates replay and dictionary lookup attacks on the authentication, but also minimizes the likelihood of extraction of secrets, with which the adversary might spoof the challenge/response, from the device. In each of the techniques, the "something you have" factor includes a PUF that is combined with the other authentication factors; the combining of the PUF and the other factors permits recreation of the secrets necessary for the challenge/response authentication.

PUFs are functions that are derived from the inherently random, physical characteristics of the material or device in which they are built. For example, silicon PUFs may exploit variations in the delay through interconnects and gates or slight differences in threshold voltage. Since the PUF exploits physical variations of the device or material in which it is built, each PUF should provide a unique (although perhaps noisy) response. This property should hold even amongst "identical" devices fabricated with the same process. Moreover, it should be difficult to purposefully produce a PUF with the same output as a given PUF. The quality of a PUF can be measured by inter-device variation and intra-device variation. Ideally, the inter-device variation of a PUF should be near 50% so different devices produce very different output, while the intra-device variation should be near 0% so that a given device consistently provides the same response. In practice, inter-device and intra-device variations will be non-ideal. Additionally, a good PUF should be resistant to changes in factors, such as, for example, temperature and supply voltage.

FIG. 1 is a functional block diagram illustrating a fingerprinting infrastructure 100 for authenticating a user of a hardware device, in accordance with an embodiment of the invention. The illustrated embodiment of infrastructure 100 includes a hardware device 105 used to authenticate a user, a challenger 110 interested in authenticating the user of the hardware device 105, and a user-device fingerprint list 115 maintained or certified by a certification authority 120. The illustrated embodiment of hardware device 105 includes a hardware platform 125, primary circuitry (or function logic) 130 of the device, a cryptographic fingerprint unit 135 including a PUF circuit 140, a biometric reader 132, a user interface 134, an optional radio-frequency identification (RFID) tag 150, and input/output ("I/O") ports 145. In the depicted embodiment, the RFID tag 150 is part of the hardware device 105. In another embodiment, the hardware platform itself can be an RFID tag. Cryptographic fingerprint unit 135 may be implemented entirely within hardware or partially using hardware and partially using software/firmware. In either embodiment, the PUF circuit 140, which may be implemented using any PUF circuit having suitably small intra-device variation and sufficiently large inter-device variation, including but not limited to silicon PUF circuits, optical coating PUFs, magnetic PUFs, etc. For example, the silicon PUFs along with primary circuitry 130 may be both integrated into hardware platform 125. For example, if hardware device 105 is a semiconductor based integrated circuit ("IC"), then the PUF circuit 140 may be integrated into the semiconductor die including device circuitry 130. Of course, other components of cryptographic fingerprint unit 135 (described below in connection with FIG. 4) may also be integrated into hardware platform 125 of hardware device 105.

Hardware device 105 may represent any device of which user authentication during the deployment phase of its lifecycle is desired. For example, hardware device 105 may represent a CPU, a microcontroller, video card, or virtually any hardware device, which may or may not include software/firmware code. In one embodiment, hardware device 105 is a hardware token. Hardware tokens, also known as security tokens, are physical devices that can be used by users to prove one's identity electronically. One type of hardware tokens is smart cards. Smart cards, also referred to as chip cards or integrated circuit cards, may include embedded integrated circuits, including, for example, non-volatile memory storage components, dedicated security logic, and/or microprocessor components. Hardware platform 125 may include a semiconductor die of an application specific IC ("ASIC") or general purpose IC (e.g., CPU), a field programmable gate array ("FPGA"), a printed circuit board ("PCB"), or otherwise. It should be appreciated that hardware platform 125 may include memory units for storing executable code (e.g., software or firmware) for operating primary circuitry 130 and/or portions of cryptographic fingerprint unit 135.

Smart cards in use today generate a private key/public key pair from a (hopefully) random seed, and then keep the private key in tamper resistant storage on the smart card and send the public key out to a trusted third party for "enrollment" in a public key authentication system. Subsequently, a challenger can use the public key to encrypt a random number that can only be decrypted by the smart card and sent back to the challenger in unencrypted form. If the decrypted random number matches the random number encrypted by the challenger then the challenge is satisfied. At this point, the authentication is complete, and the challenger is convinced that the smart card that performed these operations is the correct smart card. Note that the public key is certified as belonging to the card by some trusted third party called a certificate authority. Today's smart cards require a user to input a password or PIN to the card in order to unlock its functions and enable the challenge processing described above. So, today's smart card technology would be better described as authenticating "something the user has" that has already been authenticated using "something the user knows." The smart card stores both the secret "something the user knows" and the private key, both likely encrypted, in nonvolatile memory on the card. If an adversary can manage to extract the private key, then "something the user knows" becomes irrelevant because the adversary can answer the authentication challenge without it, by using calculations with only the private key.

Instead of having the smart card compare the "something the user knows" (e.g., password or PIN input to the card with a stored password or pin), some of the embodiments can instead modify an error-corrected PUF measurement by combining the PIN/password and/or biometric with a PUF measurement from the smart card in any of several ways, including but not limited to: 1) A hash of the PIN/password and/or biometric are combined with the PUF measurement via addition modulo 2, concatenation, or some other means. The multi-factor authentication result is used to seed a key generation algorithm as described in connection with FIGS. 2-6. 2) The PIN/password and/or biometric are incorporated into the helper data during the PUF fuzzy extractor's enrollment phase, such that if an incorrect PIN/password or biometric is input then the wrong PUF value will be produced. The PUF output is used to seed a key generation algorithm as described in connection with FIGS. 4 and 7-8.

To further explain the first option, there are several ways that the PUF can be combined with a hash of the PIN/password and/or biometric. Some PUFs (e.g. the arbiter PUF and the ring oscillator PUF) accept external inputs as a challenge and produce as a response the PUF measurement. Other PUFs (e.g. the cross-coupled inverter PUF, the SRAM PUF) do not accept external inputs. In the case of PUFs that accept external inputs the hashed PIN/Password and/or biometric can be used as the challenge presented to the PUF, and the PUF's response, or the PUF's response combined with a hashed PIN/Password and/or biometric, can be used as a seed to the key generation algorithm. As an example, let F be a PUF, c be a challenge, and P be the response to c. Then the PUF produces $F(c)=P$. Now, let B be the hash of a biometric, W be the hash of a password or PIN, P' be a future, noisy PUF measurement, e be an error vector, and C be a codeword from an error correcting code. Further, for simplicity it can be assumed that the biometric has an independent fuzzy extractor, though this is not a requirement. Then $F(W) \oplus B = P \oplus B$ could be calculated and $P \oplus B$ is used as the seed for the key generation algorithm. Future measurements produce noisy measurement $P' \oplus B$ and so the fuzzy extractor is used to recover $P \oplus B$ from $P' \oplus B$. Various examples are described below in connection with FIG. 2.

To further clarify the second option, let C be a codeword from an error correcting code, P be a PUF measurement, P' be a future, noisy PUF measurement, W be the hash of a password or PIN, B be the hash of a biometric; and e be an error vector. During a normal PUF fuzzy extractor enrollment procedure, the helper data $H_1 = P \oplus C$ is published. A future, noisy PUF measurement P' can be used to recover P by calculating $P' \oplus P \oplus C = e \oplus C$. Then the error correcting code's decoding and encoding algorithms can be used to recover C, allowing the calculation of $C \oplus H = C \oplus P \oplus C = P$. If instead the helper data $H_2 = P \oplus C \oplus B$ or $H_3 = P \oplus C \oplus W$ or $H_4 = P \oplus C \oplus B \oplus W$ is produced, then the correct PUF value can only be recovered if the PIN/password and/or biometric are known. For example, with three factor authentication the noisy PUF measurement P' would be combined with helper data $H_4$ as $P' \oplus (B \oplus W) \oplus$ $(P \oplus C \oplus B \oplus W) = e \oplus C$. Then the error correcting code's decoding and encoding algorithm are used to recover C, which permits $(C \oplus B \oplus W) \oplus H_4 = P$. Since B is the output of a hash, let us define $B = h(b)$ for some hash function $h( )$, and assume that the biometric b is identical to the biometric used during the fuzzy extraction enrollment process. However, biometrics are themselves noisy measurements. Indeed, fuzzy extraction was initially developed for application to biometric data. In this work either the biometric measurement is independently enrolled in a fuzzy extraction procedure, and this procedure used to recover b from noisy measurement b' prior to recovery of P, or else the error correcting code is sufficiently strong to correct errors in both P' and b'. In this case, after the error correcting code's decoding and encoding algorithms are used to recover C either $(C \oplus W) \oplus H_4 = P \oplus B$ or $C \oplus H_4 = P \oplus B \oplus W$ is calculated to use as a seed for the key generation algorithm. Finally, note that these alternative seeds can also be used when the biometric has an independent fuzzy extractor.

RFID tag 150 may be incorporated into hardware device 105 for the purpose of identification and tracking using radio waves. An RFID tag reader from several meters away and beyond the line of sight can read RFID tag 150. RFID tag 150 may include an integrated circuit for storing and processing information, modulating and demodulating a RF signal, and an antenna for receiving and transmitting the signal. RFID tag 150 can be implemented partially or fully in device circuitry 130. For instance, hardware device 105 may be a smart card and the RFID tag 150 can provide the ability for a challenger (human or system) to authenticate the user. Of course, hardware device 105, and/or RFID tag 150 can be used in other applications.

External communication with cryptographic fingerprint unit 135 is conducted through I/O ports 145. In one embodiment, I/O ports 145 may include existing industry standard test ports, such as a Joint Test Action Group ("JTAG") test access port ("TAP"). Of course, external communications may be multiplexed over standard data ports or other types of test ports.

The illustrated embodiment of the hardware device includes biometric reader 132. Biometric reader 132 is an electronic device that electronically measures a biometric identification value from a user. There are several forms of biometric identifications used for authentication, including but not limited to fingerprint, hand geometry, iris and face recognition. Typically, biometric readers compare the biometric identification value against a stored biometric identification value associated with the user, and if the probability that the values belong to the same person, the biometric reader 132 authenticates the user. In the embodiments described herein, the biometric reader 132 measures the biometric identification value and outputs authentication factor (biometric (BM) 144 (e.g., "something the user is") to cryptographic fingerprint unit 135 to be combined with other authentication factors to generate a multi-factor authentication value, which is used for user authentication using a cryptographic challenge and response. It should be noted, however, that the biometric reader 132 may perform some additional processing, such as noise reduction, before sending authentication factor (BM) 144 to cryptographic fingerprint unit 135. In the depicted embodiment, biometric reader 132 is disposed on or within the hardware platform. In other embodiments, biometric reader 132 is external to the hardware device 105 and communicates authentication factor (BM) 144 to cryptographic fingerprint unit 135 over a connection, such as a secured connection. In another embodiment, biometric reader 132 is integrated with challenger 110. For example, the challenger 110 may be a computing device that includes biometric reader 132. Biometric reader 132 scans the user, optionally performs noise reduction processing, and sends the biometric identification value (BM) 144 to cryptographic fingerprint unit 135 to be used for enrollment and authentication of the user using the hardware device 105. It should also be noted that 1-to-1 and 1-to-many are two possible modes of operation of biometric reader 132. Regardless of how the biometric identification value is generated, cryptographic fingerprint unit 135 receives the biometric identification value as authentication factor (BM) 144, representing "something the user is."

The illustrated embodiment of the hardware device includes user interface 134. User interface 134 is a system by which the user interacts with the hardware device 105. User interface 134 may include hardware (physical) and/or software (logical) components. User interface 134 allows the user to input another authentication factor of "something the user knows" (KW) 142, and communicates the authentication factor (KW) 142 to cryptographic fingerprint unit 135 to be combined with other authentication factors to generate the multi-factor authentication value, which is used for user authentication using a cryptographic challenge and response. For example, user interface 134 may include a keyboard or keypad to allow the user to enter a password, a secret phrase, a personal identification number (PIN), or other values that only the user would know or that would be hard for others to guess. Alternatively, user interface 134 may be other types of user interfaces, such touchscreen displays, touch pads associated with a display, or the like. In another embodiment, user interface 134 may be implemented externally to hardware device 105 and communicates the authentication factor (KW) 142 to cryptographic fingerprint unit 135 over a connection, such as a secured connection. For example, the user may input a secret password, passphrase, or PIN into a user interface of challenger 110, and challenger 110 sends the secret password, passphrase, or PIN to cryptographic fingerprint unit 135. Alternatively, other configurations may be used as would be appreciated by one of ordinary skill in the art having the benefit of this disclosure.

In one embodiment, cryptographic fingerprint unit 135 is configured to measure the PUF value and combine the PUF value with one or more other authentication factors, such as authentication factor (BM) 144 and/or authentication factor (KW) 142 received from the biometric reader 132 and the user interface 134, respectively. The PUF value remains internal to hardware device 105 and is not transmitted externally.

In another embodiment, challenger 110 includes an RFID tag, similar to RFID tag reader that is configured to receive a device identifier (ID) from the hardware device 105, such as from RFID tag 150. In this embodiment, RFID tag 150 can wirelessly transmit a RF signal to challenger 110 with the device ID. The device ID can be used by the challenger 110 to access the hardware device's public key P from the user-device fingerprint list 115, as described in more detail below. Alternatively, challenger 110 may include other circuitry than an RFID tag reader to receive the device ID from the hardware device 105.

Figure 2:
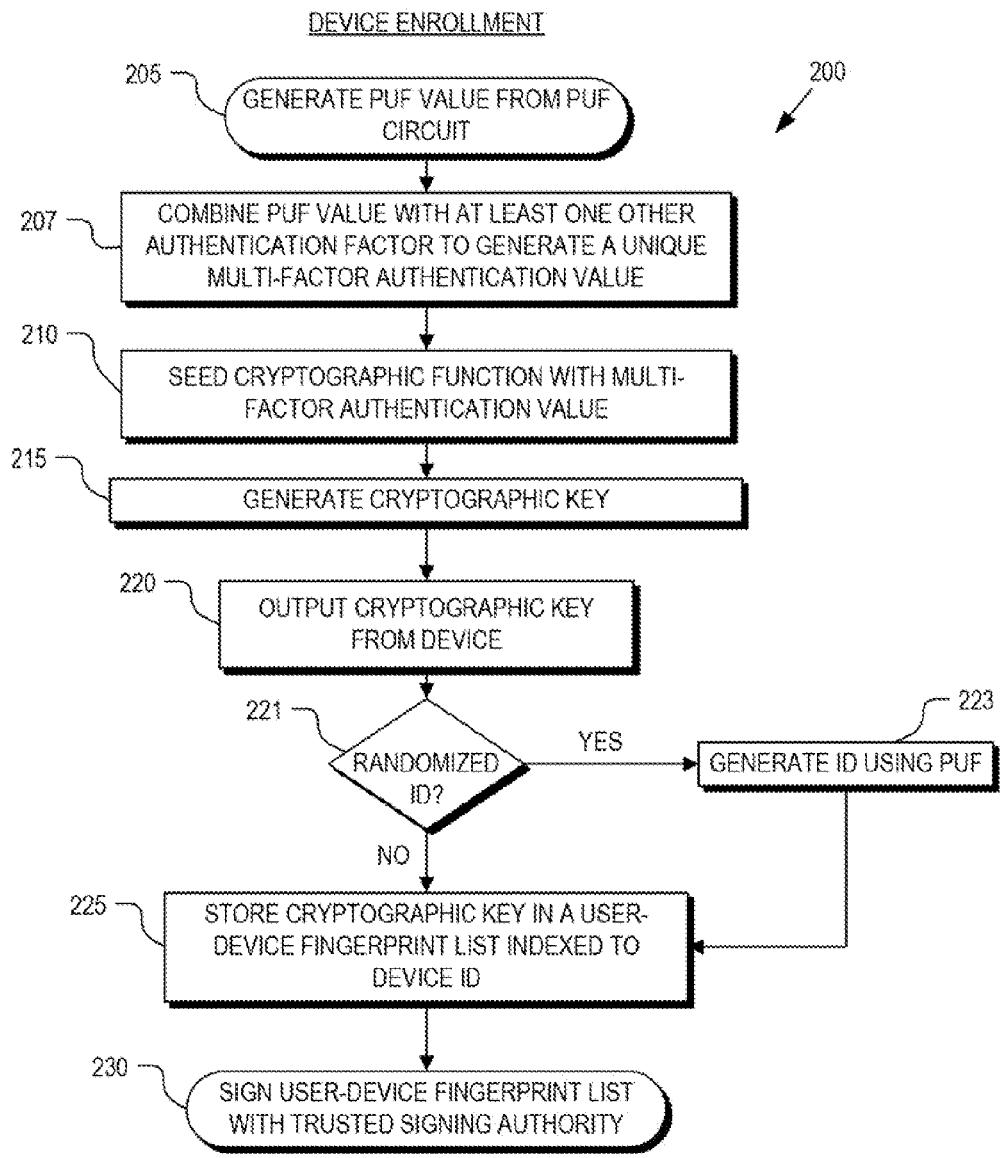
FIG. 2 is a flow chart illustrating a process for enrolling a user of a hardware device, in accordance with an embodiment of the invention.

Operation of infrastructure 100 is described in connection with processes 200 and 300 illustrated in the flow charts of FIGS. 2 and 3, respectively. FIG. 2 is a flow chart illustrating a process 200 for enrolling a user of hardware device 105, in accordance with an embodiment of the invention. The order in which some or all of the process blocks appear in process 200 should not be deemed limiting. Rather, one of ordinary skill in the art having the benefit of the present disclosure will understand that some of the process blocks may be executed in a variety of orders not illustrated.

In a process block 205, PUF circuit 140 generates a unique PUF value that is measured by cryptographic fingerprint unit 135. The PUF value remains internal to device 105 and is not transmitted externally. In one embodiment, the PUF value is generated in real-time each time it is need and is not stored for future use internally. The PUF value is a n-bit value (e.g., n=2474 bits) that may be generated via a corresponding plurality of individual PUF circuits for each bit, generated in response to 'n' input test vectors that reconfigure a single PUF circuit to generate the n-bit value, or some combination of both. In a process block 207, cryptographic fingerprint unit 135 combines the PUF value with at least one other authentication factor to generate a unique multi-factor authentication value.

In a process block 210, the multi-factor authentication value is used as a seed value to a cryptographic function. In a process block 215, the cryptographic function is used to generate a cryptographic key. For example, the cryptographic function may be the creation of a public-private key pair where the multi-factor authentication value is the seed value for the key generator. In one embodiment, the public-private key pair is generated according to the RSA cryptographic algorithm using a seed value generated from the measured PUF value, as well as one or more other authentication factors (e.g., BM 144 and/or KW 142.

In a process block 220, the cryptographic key (e.g., public key P from the public-private key pair) is output from device 105 via I/O ports 145. If a standard unique identifier ("ID") is to be used (decision block 121), then process 200 continues to a process block 225. In process block 225, the cryptographic key (e.g., public key P) is stored into a user-device fingerprint list 115 and indexed to ID referencing device 105. In this context, the combination of the cryptographic key (e.g., public key P) and ID operate as a sort of cryptographic hardware fingerprint that is uniquely associated with the particular user of the hardware device 105. In one embodiment, the ID is a manufacturing serial number, a globally unique identifier ("GUID"), or other unique identifier associated with hardware device 105. User-device fingerprint list 115 may be populated by a manufacturer of hardware device 105 prior to hardware device 105 being shipped to customers as a means of tracking and authenticating part numbers or by another entity in the supply chain wishing to provide for subsequent authentication of these devices or users of these devices. User-device fingerprint list 115 may subsequently be accessed by a customer, an OEM manufacturer incorporating device 105 into a larger system, an end-user, or a third party interacting with device 105 (either directly or remotely over a network) wishing to authenticate users of the device 105 (discussed in connection with FIG. 3). As an added security measure, user-device fingerprint list 115 may be signed and maintained by a trusted third party, such as a certification authority 120 of a public key infrastructure (process block 230).

Returning to decision block 221, if the ID is to be randomized for added security, then process 200 continues to a process block 223. In process block 223, cryptographic fingerprint unit 135 generates the ID as a randomized value. In one embodiment, the ID can be generated based on a portion of the PUF value output from PUF circuit 140. In yet another embodiment, a second ID PUF may be included within cryptographic fingerprint unit 135 for generating a randomized ID. When generating a randomized PUF based ID, an enrollment procedure may be executed to handle rare situations of collisions between PUF based IDs of two different hardware devices. In the event of an ID collision, the ID PUF can be "reprogrammed" using PUF perturbation devices 425 (discussed below in connection with FIG. 4) thus causing the ID PUF to generate a new, hopefully unique, ID value. The PUF perturbation devices 425 can be reprogrammed multiple times during the enrollment procedure until a unique ID is obtained (statistically it is highly unlikely that the perturbation devices 425 would have to be adjusted multiple times to achieve a unique output PUF value).

In another embodiment, instead of combining the one or more authentication factors to the PUF value to generate a unique multi-factor authentication value at process block 207, the one or more authentication factors are combined with the PUF value to generate helper data ($W_1$) during enrollment phase. If an incorrect PIN/password or biometric is input, then the wrong error corrected PUF value will be reproduced. In this embodiment, the error corrected PUF value is used as a seed value to a cryptographic function, such as for the creation of a public-private key pair where the PUF value is the seed value for the key generator.

In other embodiments, instead of combining the one or more authentication factors to the PUF value to generate a unique multi-factor authentication value at process block 207 or incorporating the authentication factors into the helper data ($W_1$) during enrollment phase, the one or more authentication factors can be used to challenge the PUF circuit. Some possibilities for combing the three factors include: 1) The hashed PIN/Password or biometric is used to challenge the PUF, and the hashed PUF response is used as the seed for a key generation algorithm. 2) The hashed PIN/Password is used to challenge PUF, the hashed PUF response is combined with the hashed biometric, and the result used as the seed for a key generation algorithm. 3) The hashed biometric is used to challenge the PUF, the hashed PUF response is combined with the hashed PIN/password, and the result used as the seed for a key generation algorithm. 4) The hashed PIN/password is combined with the hashed biometric and the result is used to challenge the PUF. The hashed PUF response is used as the seed for a key generation algorithm. 5) The hashed PIN/password is used to challenge a PUF, the hashed PUF response is combined with a hashed biometric, and the result is used to challenge a second PUF, which may or may not be the same PUF used previously. The hashed response from the second PUF is used as the seed for a key generation algorithm. 6) The hashed biometric is used to challenge a PUF, the hashed PUF response is combined with a hashed PIN/password and the result is used to challenge a second PUF, which may or may not be the same PUF as used previously. The hashed response from the second PUF is used as the seed for a key generation algorithm.

It should be noted that in the above scenarios, the biometric (BM) has an independent fuzzy extractor, but this is not necessarily required. In most of the scenarios, some combination of PUF measurement and PIN/password and/or biometric is used as the seed for generation of a private key/public key pair, and the challenge response protocol is similar to that used in hardware device fingerprinting, described in U.S. patent application Ser. No. 12/844,860. As done in hardware device fingerprinting, the challenger selects a random value, retrieves the prover's public key from a signed list, and encrypts the challenge with the public key. When the prover is challenged with the encrypted value the prover reproduces the seed for the key generation algorithm, recovers the private key, decrypts the challenge, and responds with the result. The prover then destroys the private key, for example, by erasing it and overwriting it with random bits, so that it is unavailable for extraction by an adversary except during the brief time it is being used. If the response matches the challenge selected by the challenger then the authentication succeeds, otherwise it fails, and the prover is not authenticated.

The above combination of elements and procedures forms methods of enrolling a user of hardware device 105 for subsequent user authentication, thus forming a means for detecting spoofing, and the detecting capability is a deterrent against spoofing of the authentication by an adversary.

Figure 3:
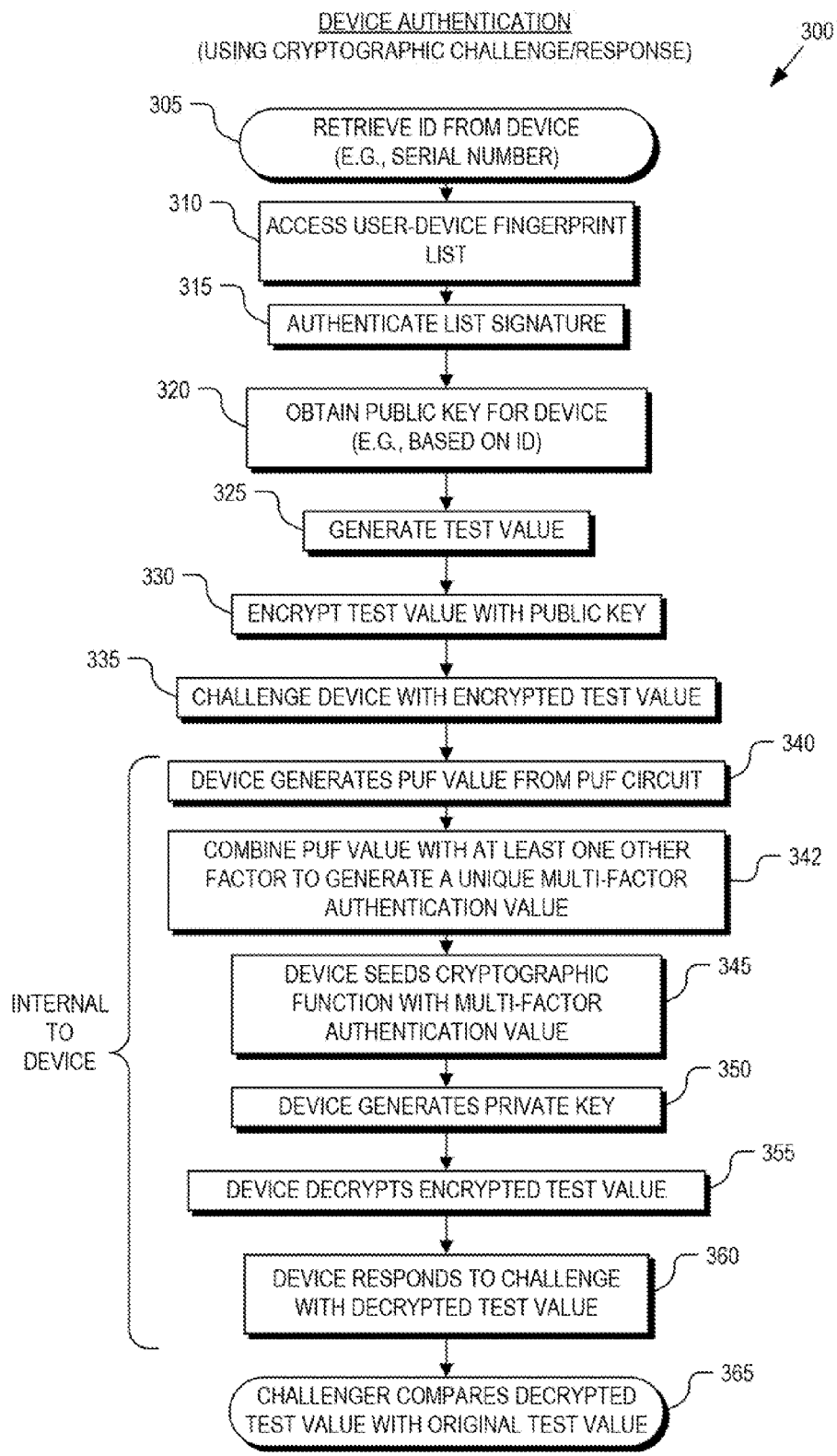
FIG. 3 is a flow chart illustrating a process for authenticating the user of the hardware device using a cryptographic challenge/response, in accordance with an embodiment of the invention.

FIG. 3 is a flow chart illustrating a process 300 for authenticating the user of hardware device 105 using a cryptographic challenge/response, in accordance with an embodiment of the invention. The order in which some or all of the process blocks appear in process 300 should not be deemed limiting. Rather, one of ordinary skill in the art having the benefit of the present disclosure will understand that some of the process blocks may be executed in a variety of orders not illustrated.

In a process block 305, challenger 110 retrieves the device ID associated with device 105. In one embodiment, the ID is retrieved from device 105 either manually or via an electronic query. For example, the ID may be a serial number physically displayed on the part (e.g., sticker, engraving, printed, etc.) or it may be electronically stored within device 105 (e.g., within non-volatile memory).

In a process block 310, challenger 110 uses the ID to access the associated public key P from user-device fingerprint list 115. In one embodiment, the ID is used to retrieve a signed certificate from certification authority 120, which includes the public key P. Upon accessing user-device fingerprint list 115, the list itself may also be authenticated with reference to its certification signature to ensure the list has not been compromised (process block 315). If the signature is validly authenticated, then challenger 110 can retrieve the public key P with assurances that it has not be tampered with (process block 320).

In a process block 325, challenger 110 generates a test value or test message for submission to cryptographic fingerprint unit 135 as a sort of secret phrase challenge. The test value can be a numeric value, an alphanumeric phrase, a nonce, or a random nonce, or otherwise. In a process block 330, challenger 110 encrypts the test value using the public key P obtained in process block 320. In a process block 335, the encrypted test value is submitted to cryptographic fingerprint unit 135 as a sort of cryptographic challenge.

If the user of the device 105 is the same user during enrollment, then its PUF circuit 140 will be able to regenerate the PUF value, which is combined with the one or more other authentication factors to generate the multi-factor authentication value, which is used to seed the key generator that created the original public-private key pair. Thus, the authentic device 105, with the correct other authentication factors, is the only device that will be able to regenerate the original private key S to decrypt the encrypted test value and respond to the challenged with the decrypted test value.

Accordingly, in a process block 340, PUF circuit 140 is enabled to regenerate the PUF value. In a process block 342, combining logic combines the PUF value with the one or more other authentication factors (e.g., BM 144 and/or KW 142) to generate the multi-factor authentication value, which is used to seed the cryptographic function (process block 345). In a process block 350, the key generator generates the private key S (process block 350). By recreating the private key S at the time of being challenged (as opposed to retrieving a stored copy of the private key S created at the time of adding the user-device fingerprint into user-device fingerprint list 115), the user of the hardware device 105 is contemporaneously being retested at the time of the challenge.

With the newly recreated private key S, cryptographic fingerprint unit 135 decrypts the test value (process block 355) and responds to challenger 110 with the decrypted test value (process block 360). Finally, in a process block 365, challenger 110 compares the test value received in the response from device 105 to the original test value it has selected and encrypted. If the two match, challenger 110 can be confident that the user of the hardware device 105 is the user previously enrolled, since the only device in possession of the private key S necessary to decrypt the test value would be the original authentic device 105 having the other authentication factors. In one embodiment, the private key is never transmitted externally to the hardware device 105, and is not stored or retained any longer than required to decrypt the authentication challenge. Each time the private key is needed by the hardware device 105, the private key is regenerated using the PUF value and the one or more other authentication factors, and then subsequently deleted or erased after use.

In another embodiment where the one or more authentication factors are incorporated into helper data ($W_1$) during enrollment phase, the helper data is used to recover the PUF value from the PUF circuit 140 at process block 340, and the one or more other authentication factors are not combined with the PUF value at process block 342. In addition, at process block 355, the cryptographic function is seeded with the PUF value, and not the multi-authentication factor.

Figure 4:
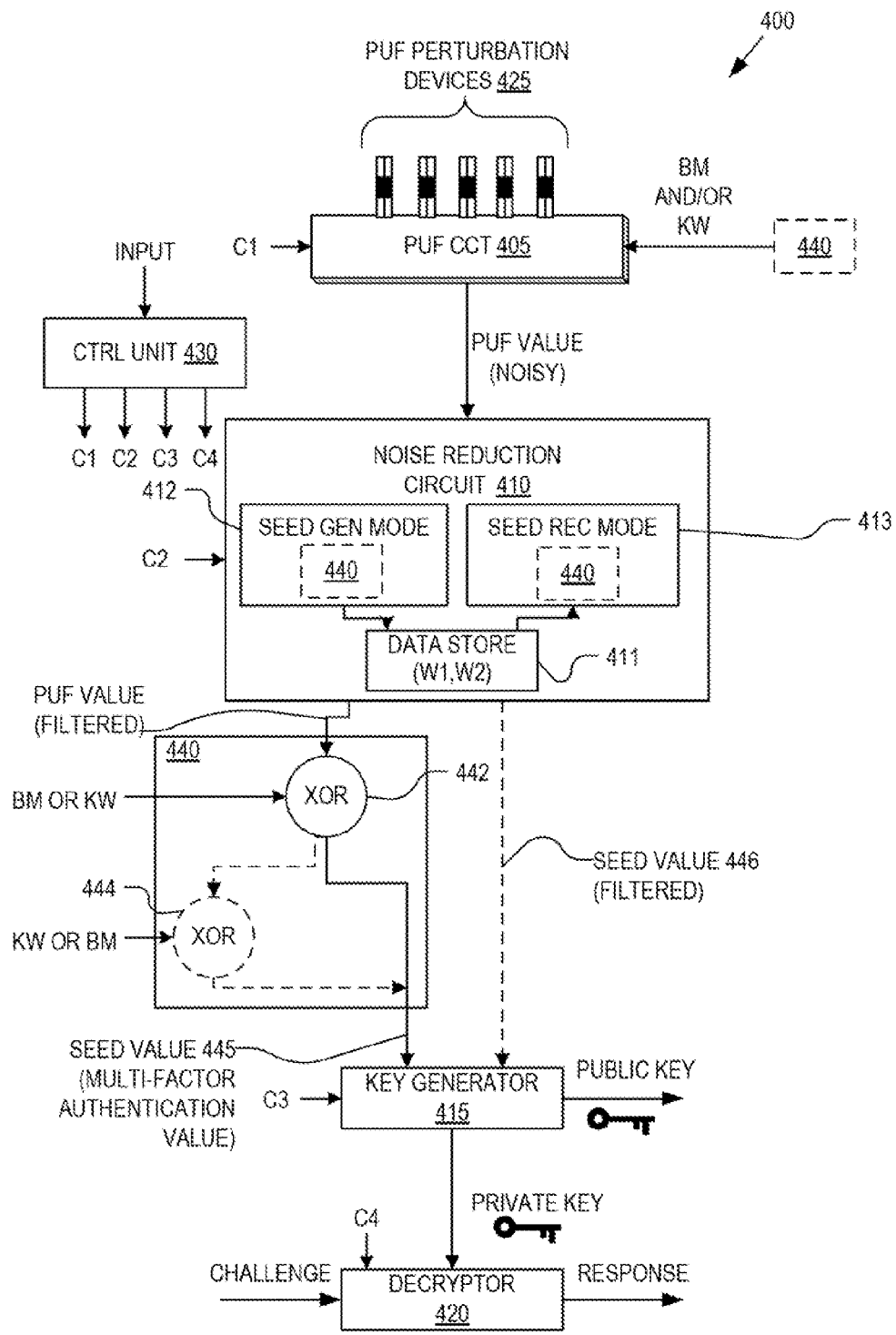
FIG. 4 is a functional block diagram illustrating a cryptographic fingerprint unit for enrolling and authenticating a user of a hardware device, in accordance with an embodiment of the invention.

FIG. 4 is a functional block diagram illustrating a cryptographic fingerprint unit 400 for enrolling and authenticating a user of hardware device 105, in accordance with an embodiment of the invention. Cryptographic fingerprint unit 400 is one possible implementation of cryptographic fingerprint unit 135 illustrated in FIG. 1. The illustrated embodiment of cryptographic fingerprint unit 400 includes a PUF circuit 405, a noise reduction circuit 410, a key generator 415, a decryptor 420, PUF perturbation devices 425, a control unit 430, and combining logic 440. The illustrated embodiment of noise reduction circuit 410 includes a data store 411, a seed generation mode 412, and a seed recovery mode 413. The seed generation mode 412 and the seed recovery mode 440 are described in more detail below in connection with FIGS. 5 and 6 where the combining logic 440 is used to combine the PUF value with the one or more other authentication factors. In other embodiments, combining logic 440 may be implemented in the seed generation mode 412 and the seed recovery mode 440 when the one or more authentication factors are incorporated into helper data ($W_1$) during enrollment phase (described in more detail below in connection with FIGS. 7 and 8). In other embodiments, combining logic 440 may be implemented to challenge the PUF circuit 405 as described in more detail below.

Control unit 430 may receive inputs and generate outputs to be coupled to the components of fingerprint unit 400 to choreograph their operation. Control unit 430 may be implemented as software/firmware instructions executing on a microcontroller, an ASIC, a state machine, or otherwise. In some embodiments, control unit 430 need not control all of the components of fingerprint unit 400. For example, in an embodiment where PUF circuit 405 is implemented using a cross-coupled type PUF, for example, then control unit 430 may not provide any control signaling to PUF circuit 405 or may simply include an enable signal to enable PUF circuit 405. However, in one embodiment where PUF circuit 405 is implemented using an arbiter type PUF, for example, control unit 430 may receive SEL bits as the INPUT to configure PUF circuit 405. The SEL bits may be part of the cryptographic challenge posed by challenger 110.

PUF perturbation devices 425 are programmable devices that can be used to increase the variability of PUF circuit 405 by affecting the delay paths within PUF circuit 405. For example, PUF perturbation devices 425 may be programmable by the end user to facilitate user customization and user control over the variability and output of PUF circuit 405. In one embodiment, PUF perturbation devices 425 are programmable anti-fuses that are either coupled to delay paths with PUF circuit 405 or disposed adjacent to a delay path within PUF circuit 405. The parasitic coupling between a coupled (or adjacent) PUF perturbation devices 425 has the effect that the programmed state of each of the PUF perturbation devices 425 can randomly change the PUF value output by PUF circuit 405. The user may program PUF perturbation devices 425 upon first use to change the PUF value and create a new user-device fingerprint, or re-creating the user-device fingerprint at a later time, if the end user ever becomes concerned that the privacy of the PUT values and/or multi-factor authentication values have been compromised.

During operation, PUF circuit 405 outputs a PUF value, which may be an inherently noisy value in some designs due to thermal variations, etc. Thus directly using the PUF value to seed key generator 415 or to be combined with the other authentication factors by combining logic 440 may not be advisable in some implementations. Accordingly, in some embodiments a noise reduction circuit 410 is interposed between PUF circuit 405 and key generator 415 or between PUF circuit 405 and combining logic 440 to convert the noisy PUF value to a filtered PUF value that is stable and repeatable (e.g., corrects for intra-device variation). While it is desirable for a given PUF circuit 405 to output different, random values between different physical devices, it is not desirable for a given PUF circuit 405 of a single instance of device 105 to output different values over its lifecycle (unless PUF perturbation devices 425 have been reprogrammed by the end user as part of a deliberate re-fingerprinting of the user and the hardware device 105). Thus, noise reduction circuit 410 operates to remove the uncertainty in the noisy PUF value. In one embodiment, the filtered PUF value is a seed value 446 that is input into key generator 415. In another embodiment, the filtered PUF value is input into combining logic 440, and combining logic provides the multi-factor authentication value as seed value 445 to key generator 415. In the depicted embodiment, combining logic 440 includes a first logic unit 442 and an optional second logic 444. In one embodiment, first logic unit 442 receives the PUF value (filtered) from noise reduction circuit 410, and combines the PUF value with a first authentication factor, such as authentication factor (BM) 144 ("something the user is") or authentication factor (KM) 142 ("something the user knows"). First logic unit 442 can output the multi-factor authentication factor as seed value 445. In another embodiment, first logic unit 442 outputs the result to second logic unit 444 to be combined with a second authentication factor, such as a different authentication factor than the one used for authentication factor (BM) 144 ("something the user is") or authentication factor (KM) 142 ("something the user knows"). For example, authentication factor (KM) 142 may be used for second logic unit 444 when authentication factor (BM) 144 ("something the user is") was used for first logic unit 442, or vice versa. Second logic unit 444 can output the multi-factor authentication factor as seed value 445. In other embodiments, the different values for the same types of authentication factors can be used for both first logic unit 442 and second logic unit 444, such as two values of the authentication factor (KM). Alternatively, other combinations of authentication factors can be combined with the PUF value, such as three or more disparate or similar authentication factors. It should also be noted that additional authentication factors of "something the user has" could also be combined with the PUF value, which represents an authentication factor of "something the user has." It should also be noted that the depicted embodiments of first logic unit 442 and second logic unit 444 are XOR operations. However, in other embodiments, the functions of the first logic unit 442 and second logic unit 44 may be, for example, a XNOR operation, a NAND operation, an AND operation, an OR operation, a concatenation operation, or any other operation. It should be noted that the operation should be repeatable, but not necessarily reversible or invertible.

In one embodiment, noise reduction circuit 410 is implemented as a fuzzy extractor, which uses error correcting code ("ECC") techniques to remove undesirable variability. Operation of a fuzzy extractor implementation of noise reduction circuit 410 is discussed in detail in connection with FIGS. 5-8 below.

Key generator 415 is coupled to receive a seed value, which is either based on the PUF value measured from PUF circuit 405 or the multi-factor authentication value generated by combining logic 440. Key generator 415 uses the seed value to seed its encryption engine and generate a unique public-private key pair. In one embodiment, the public-private key pair is generated according to the RSA (Rivest, Shamir and Adleman) cryptographic algorithm. During operation, the private key is also kept internal to cryptographic fingerprint unit 400 and never exported externally from hardware device 105 in accordance with one embodiment. In contrast, during the fingerprinting operation, the public key P is exported from device 105 along with a device ID to enroll the user-device fingerprint with user-device fingerprint list 115.

Cryptographic fingerprint unit 400, as the sole holder and regenerator of the private key S, is the only entity capable of decrypting a message encrypted using the corresponding public key P. Thus, during an authentication event, challenger 110 will present its cryptographic challenge in the form of an encrypted message to hardware device 105. Decryptor 420 receives the challenge and uses the private key S to decrypt the message and generate the response.

In another embodiment, combining logic 440 is coupled to receive the one or more other authentication factors, and challenges PUF circuit 405 with the one or more authentication factors. In one embodiment, combining logic 440 challenges the PUF circuit 405 with a hashed PIN/Password (KW 142) or biometric (BM 144), and the hashed PUF response of the PUF circuit 405 is used as seed value 446 for a key generation algorithm. In another embodiment, combining logic 440 challenges the PUF circuit 405 with a hashed PIN/Password (KW 142), and combining logic 440 combines the hashed PUF response with or a hashed biometric (BM 144), and the result is used as seed value 446 for a key generation algorithm. In another embodiment, combining logic 440 challenges the PUF circuit 405 with a hashed biometric (BM 144), and combining logic 440 combines the hashed PUF response with or a hashed PIN/Password (KW 142), and the result is used as seed value 446 for a key generation algorithm. In another embodiment, combining logic 440 combines the hashed PIN/password and the hashed biometric, and challenges the PUF circuit 405 with the combined value, and the hashed PUF response of the PUF circuit 405 is used as seed value 446 for a key generation algorithm. In another embodiment, combining logic 440 challenges the PUF circuit 405 with a hashed PIN/Password (KW 142), and combining logic 440 combines the hashed PUF response with or a hashed biometric (BM 144), and the result is used to challenge a second PUF, which may or may not be the same as PUF circuit 405. The hashed response from the second PUF is used as seed value 446 for a key generation algorithm. In another embodiment, combining logic 440 challenges the PUF circuit 405 with a hashed biometric (BM 144), and combining logic 440 combines the hashed PUF response with or a hashed PIN/Password (KW 142), and the result is used to challenge a second PUF, which may or may not be the same as PUF circuit 405. The hashed response from the second PUF is used as seed value 446 for a key generation algorithm. It should be noted that these various embodiments need to combine the authentication factors in the same manner for enrollment as for later decryption of the challenge as would be appreciated by one of ordinary skill in the an having the benefit of this disclosure.

The illustrated embodiment of noise reduction circuit 410 includes at least two modes of operation: seed generation mode 412 and a seed recovery mode 413. Control unit 430 places noise reduction circuit 410 into the seed generation mode 412 during enrollment of the user of the hardware device (e.g., when creating a new user-device fingerprint for device 105, while control unit 430 places noise reduction circuit 410 into the seed recovery mode 413 during a cryptographic authentication event.

Figure 5:
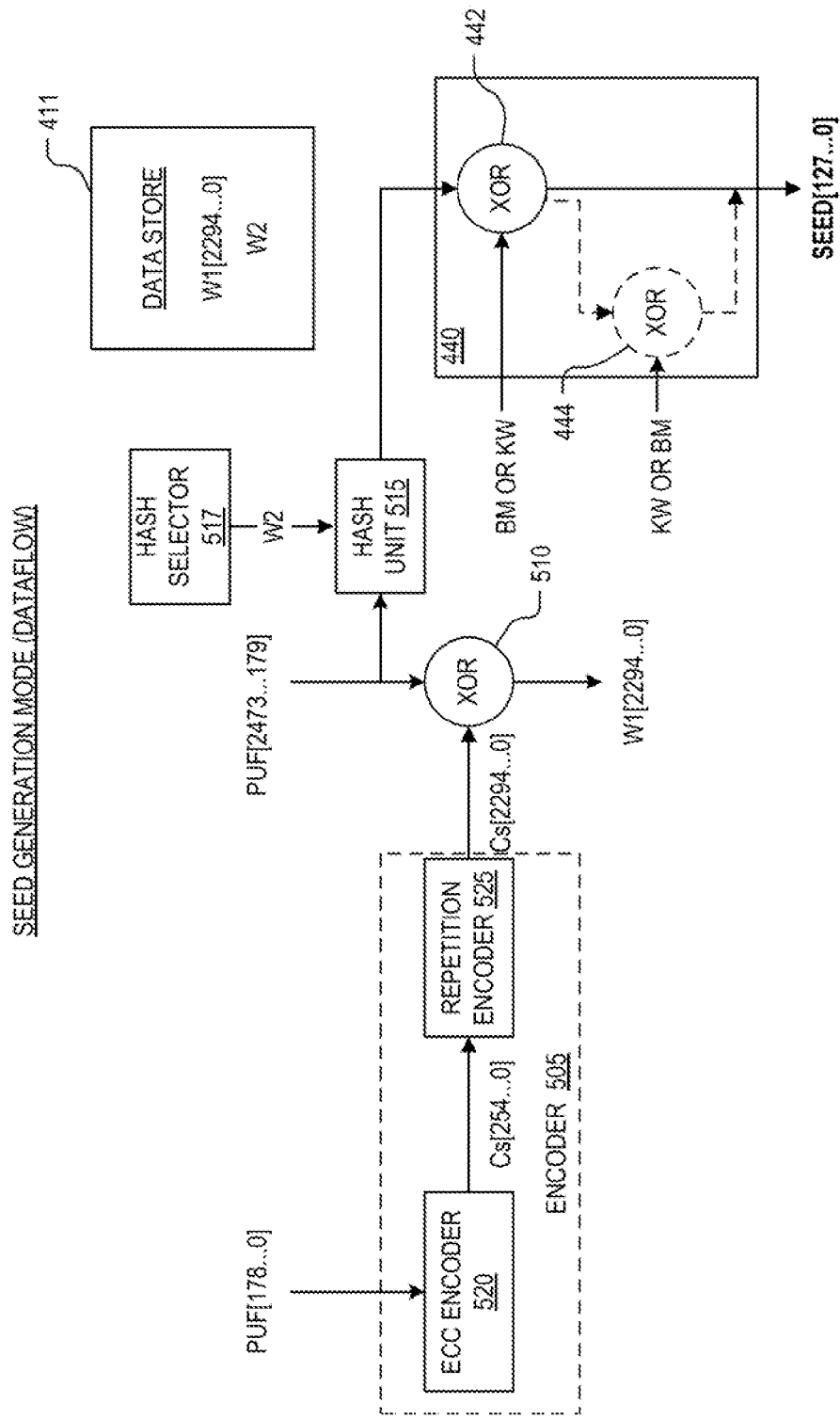
FIG. 5 is a dataflow diagram illustrating a seed generation mode of a noise reduction circuit during enrollment, in accordance with an embodiment of the invention.

FIG. 5 is a dataflow diagram illustrating seed generation mode 412 of noise reduction circuit 410 during enrollment, in accordance with an embodiment of the invention. During seed generation mode 412, noise reduction circuit 410 is configured to include an encoder 505, a logic unit 510, a hash unit 515, a hash selector 517, and data store 411. The illustrated embodiment of encoder 505 includes an ECC encoder 520 and a repetition encoder 525.

Noise reduction circuit 410 may be configured to operate in the seed generation mode 412 by enabling hardware components to implement the dataflow illustrated in FIG. 5, by loading/executing software/firmware modules to implement the dataflow illustrated in FIG. 5, by reconfiguring interconnections between the ECC encoder 520, repetition encoder 525, logic unit 510, and hash unit 515 to form the dataflow illustrated in FIG. 5, some combination thereof, or otherwise. Each component illustrated in FIG. 5 may be implemented entirely in hardware, entirely in software, or a combination of both.

In the illustrated embodiment, noise reduction in the noisy PUF value is achieved via application of error correction techniques to the PUF value so that future bit errors in the PUF value can be identified and corrected to generate a reliable, consistent seed value. A variety of ECC techniques may be applied (e.g., Reed-Solomon, repetition, Hamming, low-density parity-check (LDPC), etc); however, in one embodiment, ECC encoder 520 is implemented using a BCH (Bose, Chaudhuri, Hocquenghem) encoder to generate an error correcting codeword Cs. To ensure security and prevent an adversary from reverse generating the seed value, the codeword Cs should be selected randomly. Accordingly, in one embodiment, a first portion of the PUF value itself is used to generate the codeword Cs during the seed generation mode 412.

During operation of the seed generation mode 412, PUF circuit 405 is enabled and its output PUF value measured. A first portion of the PUF value PUF[178 . . . 0] is provided to encoder 505 while a second portion of the PUF value PUF [2473 . . . 179] is provided to logic unit 510 and hash unit 515. ECC encoder 520 uses the first portion PUF[178 . . . 0] to generate the codeword Cs[254 . . . 0]. The codeword is expanded using repetition encoder 525 to generate codeword Cs[2294 . . . 0]. Although FIG. 5 illustrates the use of a 255-bit codeword and a 9x repetition encoder, longer or shorter codewords and higher or lower repetition encoders may be used according to the level of noise in the PUF value. It should be noted that one technique for improving error correcting ability is to concatenate codes, such as by a concatenation of a strong code (such as BCH) and weak code (such as repetition) as described in connection with FIG. 5, but other techniques may be used. Similarly, although FIG. 5 illustrates a 2474-bit PUF value, longer or shorter PUF values may be used according to the desired strength of security. Repetition encoder 525 may be replaced by other types of encoders as well, or omitted entirely.

Logic unit 510 combines the second portion of the PUP value PUF[2473 . . . 179] with the codeword Cs[2294 . . . 0] to generate helper data $W_1$[2294 . . . 0]. In the illustrated embodiment, logic unit 510 uses an XOR function to combine the two values, though other logic functions may be implemented. It should be noted that other logic functions need to be reversible, and that in the output, the two inputs are hidden so that one cannot look at the output and determine the inputs. The helper data $W_1$[2294 . . . 0] is a value, which is used during the seed recovery mode 413 to regenerate the seed value SEED[127 . . . 0] generated during seed generation mode 412, but the helper data cannot easily be leveraged to surreptitiously reverse engineer the codeword Cs[2294 . . . 0]. Hash unit 515 hashes the second portion PUF[2473 . . . 179] to generate a first value that is output to combining logic 440. Combining logic 440 receives the first value from hash unit 515 and combines it with one or more other authentication factors, such as authentication factor (BM) 144 and/or authentication factor (KW) 142, to generate a fixed-length seed value SEED[127 . . . 0]. The hash unit 515 performs a function known as "privacy amplification" or "entropy amplification" since the entropy per bit in the PUF[2473 . . . 179] will be less than one. In one embodiment, the width of the PUF value input into hash unit 515 and the width of the seed value output from combining logic 440 is engineered to compensate for average deficiency in entropy rate in the inter-device variability of the PUF measurement.

In one embodiment, for added security the particular hash algorithm is also selected from a large set of hash algorithms, in which case, helper data $W_2$ indicating the particular hash algorithm selected is also stored into data store 411. In one embodiment, hash selector 517 generates $W_2$ to implement a randomized selection of the hash algorithm. In one embodiment, hash selector 517 uses a portion of the PUF value to randomly select a particular hash algorithm from a LFSR hash. In one embodiment, hash selector 517 includes an LFSR hash coupled to receive a portion of the PUF value. The output of the LFSR hash is then coupled into an irreducible polynomial generator, which outputs the $W_2$ value for selecting the hash algorithm. In yet another embodiment, hash selector 517 includes a random number generator coupled to an irreducible polynomial generator to generate $W_2$.

Figure 6:
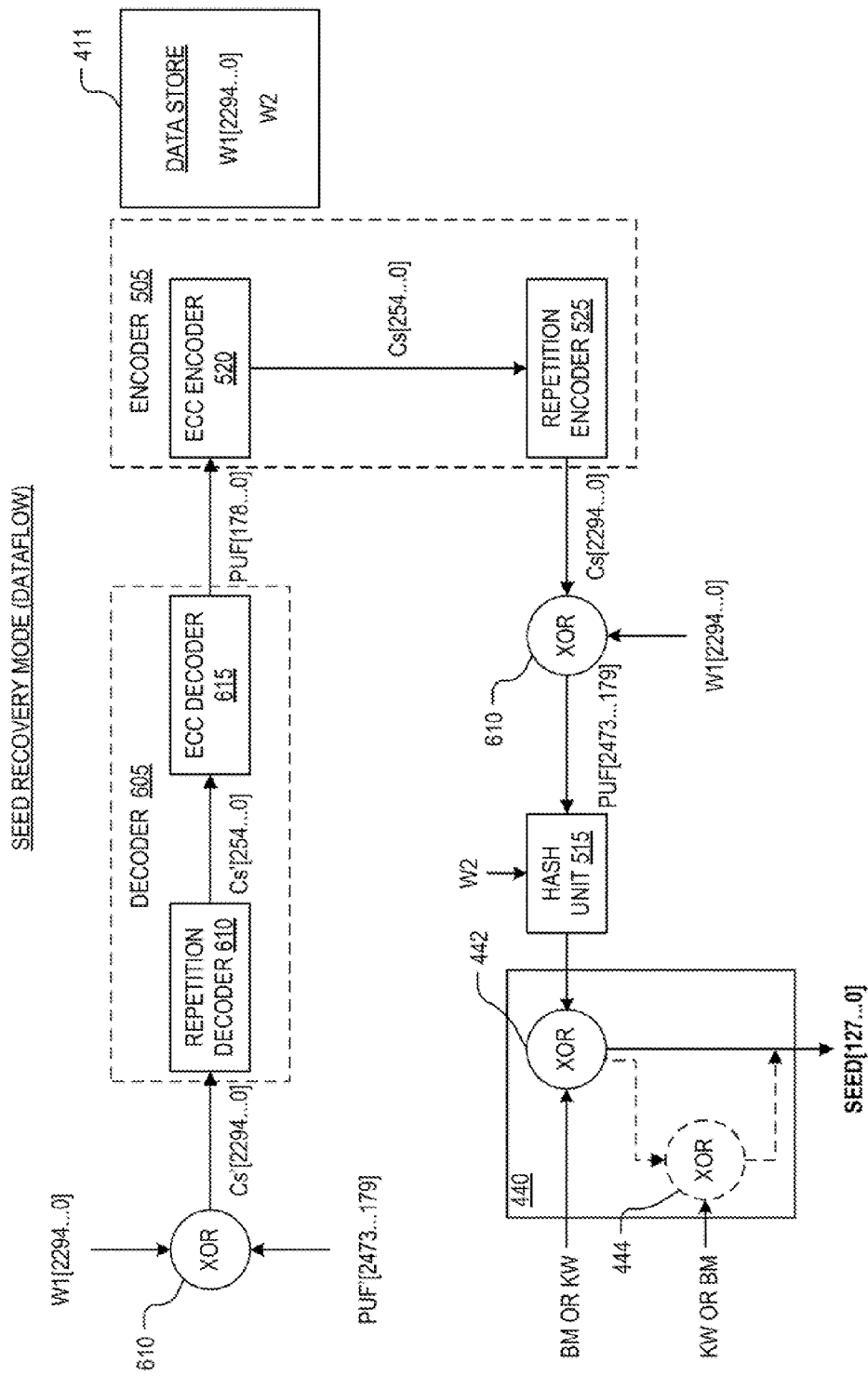
FIG. 6 is a dataflow diagram illustrating a seed recovery mode of a noise reduction circuit during authentication, in accordance with an embodiment of the invention.

FIG. 6 is a dataflow diagram illustrating seed recovery mode 413 of noise reduction circuit 410 during authentication, in accordance with an embodiment of the invention. During seed recovery mode 413, noise reduction circuit 410 is configured to include two logic units 610, a decoder 605, encoder 505, and hash unit 515. The illustrated embodiment of decoder 605 includes a repetition decoder 610 and an ECC decoder 615.

Noise reduction circuit 410 may be configured to operate in the seed recovery mode 413 by enabling hardware components to implement the dataflow illustrated in FIG. 6. The dataflow illustrated in FIG. 6 may be achieved by loading/executing software/firmware modules, by reconfiguring interconnections between the components, some combination thereof, or otherwise. Each component illustrated in FIG.

6 may be implemented entirely in hardware, entirely in software, or a combination of both.

During operation of the seed recovery mode 413, PUF circuit 405 is enabled and its output PUF value measured. Since the PUF value is a noisy value, this measured value may not be identical to the original PUF value measured during seed generation mode 412. Accordingly, this subsequent measured PUF value is labeled as PUF' and the error correcting codeword generated based on PUF' is labeled as Cs' in FIG. 6.

A first portion of the PUF' value PUF'[2473 . . . 179] is combined by logic unit 610 with the helper data $W_1$[2294 . . . 0] to generate the codeword Cs'[2294 . . . 0]. If PUF' happens to be identical to PUF, then Cs' would be equal to Cs. However, if PUF' is a noisy value with at least one flipped bit, then PUF' does not equal PUF and error correcting techniques will remove the errors and regenerate the original PUF value PUF[2473 . . . 179], which is combined with the one or more other authentication factors to regenerate the original seed value SEED[127 . . . 0].

Repetition decoder 610 decodes Cs'[2294 . . . 0] down to Cs'[254 . . . 0], which is input into ECC decoder 615 to generate the original PUF[178 . . . 0]. With the original first portion of the PUF value in hand, PUF[178 . . . 0] is inserted back into encoder 505 to generate the original codeword Cs[2294 . . . 0]. With Cs[2294 . . . 0] in hand, logic unit 610 is once again used to combine Cs[2294 . . . 0] with helper data $W_1$[2294 . . . 0] stored in data store 411 to regenerate the original second portion of the PUF value PUF[2473 . . . 179]. Finally, hash unit 515 uses the second portion of the PUF value to recreate the first value, which is combined with the one or more other authentication factors by combining logic 440 to generate the original seed value SEED[127 . . . 0]. If a fixed hash algorithm is not used, then helper data $W_2$ is retrieved from data store 411 to select the appropriate hash algorithm.

Figure 7:
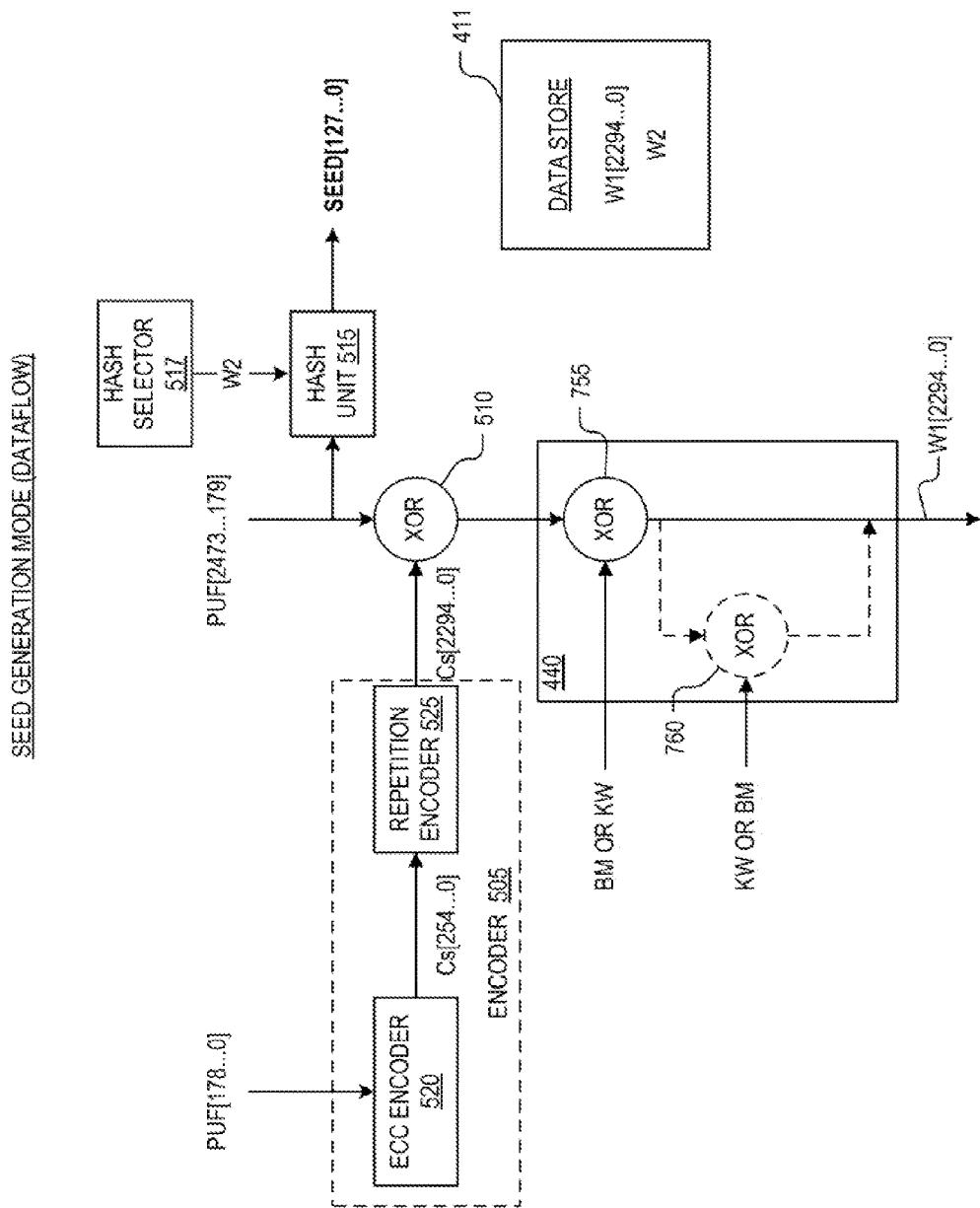
FIG. 7 is a dataflow diagram illustrating a seed generation mode of a noise reduction circuit during enrollment, in accordance with another embodiment of the invention.

FIG. 7 is a dataflow diagram illustrating seed generation mode 412 of noise reduction circuit 410 during enrollment, in accordance with another embodiment of the invention. During seed generation mode 412, noise reduction circuit 410 is configured to include the same components as described above with respect to FIG. 5, except combining logic 440 is used to generate the helper data $W_1$, instead of a multi-factor authentication value, which is used as the seed value SEED [127 . . . 0].

During operation of the seed generation mode 412, PUF circuit 405 is enabled and its output PUF value measured. A first portion of the PUF value PUF[178 . . . 0] is provided to encoder 505 while a second portion of the PUF value PUF [2473 . . . 179] is provided to logic unit 510 and hash unit 515. ECC encoder 520 uses the first portion PUF[178 . . . 0] to generate the codeword C[254 . . . 0]. The codeword is expanded using repetition encoder 525 to generate codeword Cs[2294 . . . 0].

Logic unit 510 combines the second portion of the PUF value PUF[2473 . . . 179] with the codeword Cs[2294 . . . 0] to generate a first value that is output to combining logic 440. Combining logic 440 receives the first value from hash unit 515 and combines it with one or more other authentication factors, such as authentication factor (BM) 144 and/or authentication factor (KW) 142, to generate helper data $W_1$[2294 . . . 0]. The helper data $W_1$[2294 . . . 0] is a value, which is used during the seed recovery mode 413 to regenerate the seed value SEED[127 . . . 0] generated during seed generation mode 412, but the helper data cannot easily be leveraged to surreptitiously reverse engineer the codeword Cs[2294 . . . 0]. In the illustrated embodiment, combining logic 440 includes a first logic unit 755 and an optional second logic unit 760. First logic unit 755 receives the first value from logic unit 510, and combines it with a first authentication factor, such as authentication factor (BM) 144 ("something the user is") or authentication factor (KM) 142 ("something the user knows"). First logic unit 775 can output its value to be used as the helper data $W_1$[2294 . . . 0]. In another embodiment, first logic unit 775 outputs the result to second logic unit 760 to be combined with a second authentication factor, such as another authentication factor than the one used for authentication factor (BM) 144 ("something the user is") or authentication factor (KM) 142 ("something the user knows"), such as authentication factor (KM) 142 when authentication factor (BM) 144 ("something the user is") was used for first logic unit 442, or vice versa. Second logic unit 760 can output its value to be used as the helper data $W_1$[2294 . . . 0]. In other embodiments, the different values for the same types of authentication factors can be used for both first logic unit 755 and second logic unit 760, such as two values of the authentication factor (KM). Alternatively, other combinations of authentication factors can be combined with the first value to generate the helper data $W_1$, such as three or more disparate or similar authentication factors. It should also be noted that additional authentication factors of "something the user has" could also be combined with the first value to generate the helper data $W_1$. It should also be noted that the depicted embodiments of logic unit 510, first logic unit 755, and second logic unit 760 are XOR operations. However, in other embodiments, the functions of t logic unit 510, first logic unit 755, and second logic unit 760 may be, for example, a XNOR operation, a NAND operation, an AND operation, an OR operation, a concatenation operation, or any logic operation that does not amplify the noise.

Hash unit 515 hashes the second portion PUF[2473 . . . 179] to generate the fixed length seed value SEED[127 . . . 0]. The hash unit 515 performs a function known as "privacy amplification" or "entropy amplification" since the entropy per bit in the PUF[2473 . . . 179] will be less than one. In one embodiment, the width of the PUF value input into hash unit 515 and the width of the seed value output from hash unit 515 is engineered to compensate for average deficiency in entropy rate in the inter-device variability of the PUF measurement.

Figure 8:
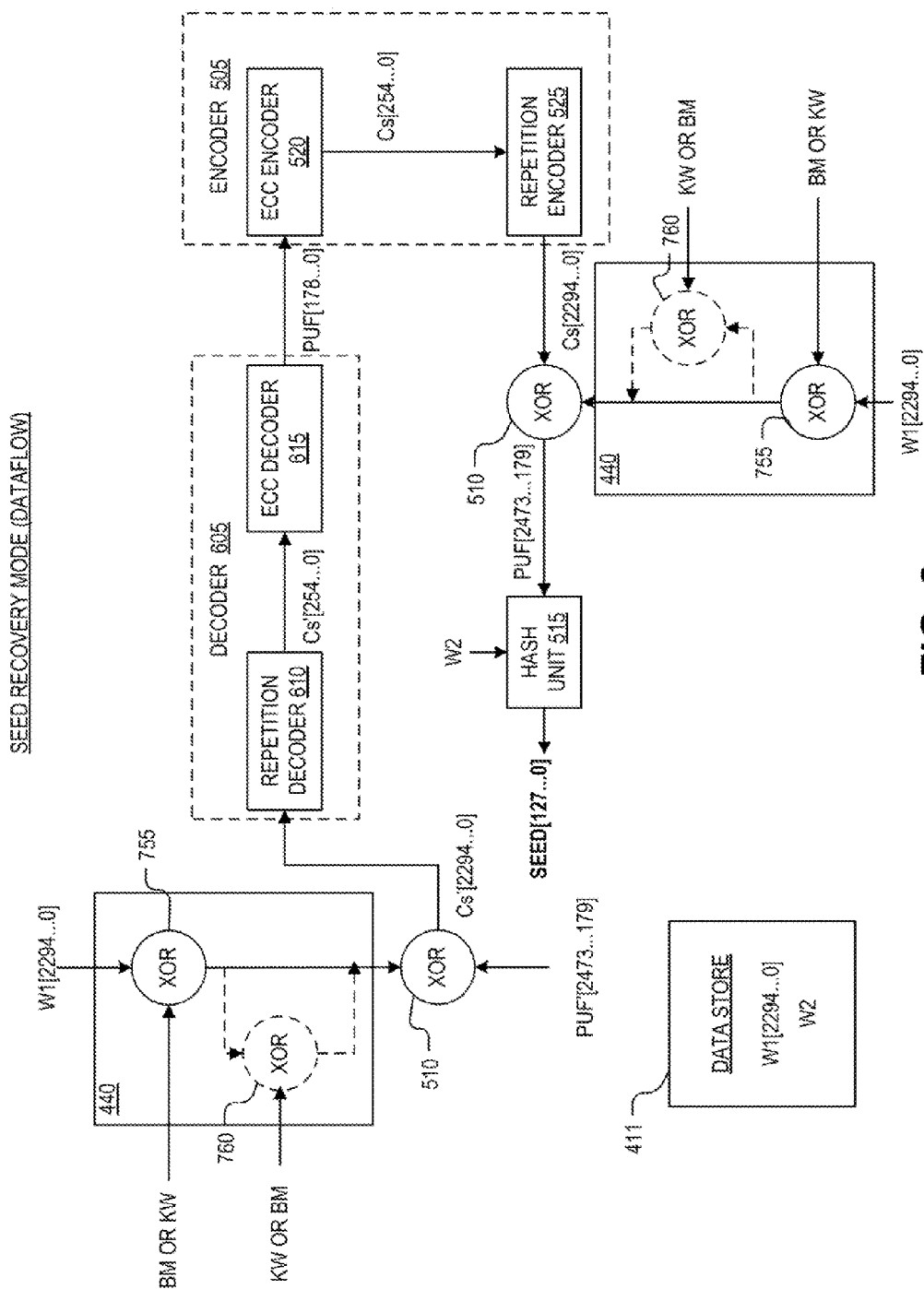
FIG. 8 is a dataflow diagram illustrating a seed recovery mode of a noise reduction circuit during authentication, in accordance with another embodiment of the invention.

FIG. 8 is a dataflow diagram illustrating seed recovery mode 413 of noise reduction circuit 410 during authentication, in accordance with an embodiment of the invention. During seed recovery mode 413, noise reduction circuit 410 is configured to include the same components as described above with respect to FIG. 5, except combining logic 440 receives the helper data $W_1$ to be combined with other authentication factors to recover the seed value SEED[127 . . . 0].

During operation of the seed recovery mode 413, PUF circuit 405 is enabled and its output PUF value measured. Since the PUF value is a noisy value, this measured value may not be identical to the original PUF value measured during seed generation mode 412. Accordingly, this subsequent measured PUF value is labeled as PUF' and the error correcting codeword generated based on PUF' is labeled as Cs' in FIG. 8.

Combining logic 440 receives the helper data $W_1$[2294 . . . 0] and combines it with the one or more other authentication factors as described above in connection with FIG. 7. By combining the helper data with the other authentication factors, combining logic 440 recreates the first value and outputs the first value to logic units 510. A first portion of the PUF' value PUF'[2473 . . . 179] is combined by logic unit 510 with the first value to generate the codeword Cs'[2294 . . . 0]. If PUF' happens to be identical to PUF, then Cs' would be equal to Cs. However, if PUF' is a noisy value with at least one flipped bit, then PUF' does not equal PUF and error correcting techniques will remove the errors and regenerate the original PUF value PUF[2473 . . . 0] and the original seed value SEED[127 . . . 0].

Repetition decoder 610 decodes Cs'[2294 . . . 0] down to Cs'[254 . . . 0], which is input into ECC decoder 615 to generate the original PUF[178 . . . 0]. With the original first portion of the PUF value in hand, PUF[178 . . . 0] is inserted back into encoder 505 to generate the original codeword Cs[2294 . . . 0]. With Cs[2294 . . . 0] in hand, logic unit 510 is once again used to combine Cs[2294 . . . 0] with the first value to regenerate the original second portion of the PUF value PUF[2473 . . . 179]. Finally, hash unit 515 uses the second portion of the PUF value to recreate the original seed value SEED[127 . . . 0]. If a fixed hash algorithm is not used, then helper data $W_2$ is retrieved from data store 411 to select the appropriate hash algorithm.

Silicon PUFs can be broadly categorized as delay based and memory based. Delay based PUFs, such as a ring oscillator PUF and an arbiter, measure the difference in delay through "identical" circuits. Memory based PUFs exploit variations in memory structures, such as cross-coupled logic gates and latches and SRAM cells. Various examples of different silicon PUF circuits include, but are not limited to arbiter type PUFs, ring oscillator type PUFs, cross-coupled type PUFs, and butterfly type PUFs, described briefly below. Other PUFs can be used, for example, optical coating PUFs, magnetic PUFs, etc. Alternatively, other types of PUFs may be suitable, as long as a given PUF design has sufficiently small intra-device variation and sufficiently large inter-device variation given a desired level of security. For example, intrinsic PUFs, which are created from a resource that already exists on a chip may be used. In the case of FPGAs, the startup values of SRAM and flip-flops may be leveraged. The primary advantage of intrinsic PUFs is that they are already present on the FPGA, and so only a readout circuit is needed to obtain the value of the PUF. In this sense, fewer FPGA resources are required to implement the function. However, in some cases it may be difficult to read the value of an intrinsic PUF, since SRAM and flip-flop states on FPGAs are commonly forced into a known state upon power up. As such, modification of the bit stream loaded into the FPGA may be necessary for readout.

An arbiter type PUF has multiple stages, each stage is a switch circuit that may include a pair of two input multiplexers with a shared select signal (SEL). A pulse is presented to the inputs at the first stage, and the signal races along the two paths in the subsequent stages, switching between the lower and upper paths as determined by the SEL input at each stage. When one of the inputs arrives first, the output is '0," and when the other input arrives first, the output is '0.' The arbiter type PUF generates a challenge-response pair, where the challenge is the input, or sequence of inputs, and the response is the output or sequence of outputs; the PUF output is the response to the a particular input challenge.

A ring oscillator type PUF exploits variations in the resonance frequencies of a set of identical ring oscillators. To produce an output bit, the resonance frequencies of the ring oscillators are compared and the output bit is determined by which oscillator is fastest. A k bit sequence is produced by making k comparisons between multiple different ring oscillators.

The cross-coupled PUF type uses a positive feedback loop to store a bit. Without applying any external stimulus, the output of cross-coupled PUF will attain a stable output. The value of this output results from differences in interconnect delay and the voltage transfer characteristics of the inverters. A k bit sequence can be obtained from k cross-coupled inverter pairs. Other logic gates, such as NAND and NOR gates, can also be connected in a cross-coupled configuration to be used as a PUF.

The butterfly type PUF may include cross-coupled D latches, having enable inputs (E) that are tied high so that the D input is always transferred to the Q output. To operate the circuit as a PUF, "in" is set to '1', which causes the active high "clr" and "pre" signals to set Q1='0', Q2='1'. Since the latches are cross-coupled, this forces $D_1$='1' and $D_2$='0'. These inputs are ignored while "in" is asserted. Next, "in" is set to '0', which causes the system to enter an unstable state. At this point, the positive feedback loop and differences in wire and latch propagation delays force the output to a stable value. As with the cross-coupled PUF, k bits are generated by implementing k butterfly PUFs within a given device.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A hardware device, comprising:
    a hardware platform;
    device circuitry coupled to perform a primary function of the hardware device disposed in or on the hardware platform; and
    a cryptographic fingerprint unit for authenticating a user of the hardware device, the cryptographic fingerprint unit including:
        a physically unclonable function ("PUF") circuit disposed in or on the hardware platform, wherein the PUF circuit is a first authentication factor representing something the user has; and
        combining logic coupled to receive at least one other authentication factor and challenge the PUF circuit with the at least one other authentication factor, wherein the at least one other authentication factor is at least one of a second authentication factor representing something the user knows or a third authentication factor representing something the user is, and wherein the PUF circuit is coupled to receive the at least one other authentication factor as a challenge and coupled to output a PUF value in response to being challenged with the at least one other authentication factor, the combining logic coupled to generate a multi-factor authentication value based on the PUF value;

wherein the cryptographic fingerprint unit uses the multi-factor authentication value to allow a challenger to authenticate the user of the hardware device.

2. The hardware device of claim 1, wherein the hardware device is a hardware token.

3. The hardware device of claim 1, wherein the combining logic is coupled to combine the PUF value with the third authentication factor or the second authentication factor to generate the multi-factor authentication value, and wherein the multi-factor authentication value is used to seed a key generation algorithm.

4. The hardware device of claim 1, wherein the combining logic is coupled to combine the second and third authentication factors to generate a first value, wherein the combining logic is coupled to challenge the PUF circuit with the first value, wherein the PUF circuit is coupled to output the PUF value as the multi-factor authentication value in response to being challenged with the first value, and wherein the multi-factor authentication value is used to seed a key generation algorithm, the multi-factor authentication value based on the second PUF value.

5. The hardware device of claim 1, wherein the combining logic is coupled to combine the PUF value with the third authentication factor or the second authentication factor to generate a first value, wherein the combining logic is coupled to challenge a second PUF circuit with the first value, wherein the second PUF is coupled to output a second PUF value, and wherein the second PUF value is used to seed a key generation algorithm.

6. The hardware device of claim 5, wherein the PUF circuit and the second PUF circuit are the same PUF circuit.

7. The hardware device of claim 1, wherein the cryptographic fingerprint unit further comprises:
a key generator coupled to generate a private key and a public key based on the multi-factor authentication value; and
a decryptor coupled to receive an authentication challenge posed to the hardware device, encrypted with the public key, and coupled to output a response to the authentication challenge decrypted with the private key.

8. The hardware device of claim 7, further comprising a noise reduction circuit coupled between the PUF circuit and the combining logic, the noise reduction circuit coupled to receive the PUF value, to reduce uncertainty in the PUF value, and to output a filtered PUF value to the combining logic, and wherein the combining logic is coupled to output a seed value to the key generator based on the filtered PUF value and the at least one other authentication factor.

9. The hardware device of claim 7, wherein the cryptographic unit is to delete the multi-factor authentication value, the PUF value, and the at least one other authentication factor after the key generator generates the private and public keys.

10. The hardware device of claim 7, further comprising a noise reduction circuit coupled between the PUF circuit and the key generator, the noise reduction circuit coupled to receive the PUF value, to reduce uncertainty in the PUF value, and to output a seed value to the key generator based on the PUF value.

11. The hardware device of claim 10, wherein the combining logic is part of the noise reduction circuit and is coupled to generate helper data based on the PUF value and the at least one other authentication factor.

12. The hardware device of claim 1, wherein the combining logic is coupled to output the PUF value as the multi-factor authentication value, and wherein the PUF value is used to seed a key generation algorithm.

13. The hardware device of claim 1, wherein the combining logic is coupled to hash the at least one other authentication factor to generate a hashed authentication factor and challenge the PUF circuit with the hashed authentication factor.

14. A method for enrolling a user of a hardware device for subsequent authentication, the method comprising:
challenging a physically unclonable function ("PUF") circuit with a second authentication factor representing a biometric of the user to generate a multi-factor authentication value, wherein the biometric of the user is measured by a biometric reader of the hardware device and the PUF circuit is coupled to receive the second authentication factor as a challenge, and wherein the PUF circuit is a first authentication factor representing something the user has;
seeding a cryptographic function based on the multi-factor authentication value;
generating a cryptographic key from the cryptographic function; and
storing the cryptographic key of the hardware device for future use by a challenger to authenticate the user of the hardware device using a cryptographic challenge and response.

15. The method of claim 14, wherein generating the cryptographic key comprises generating the cryptographic key as a public key of a private-public key pair.

16. The method of claim 14, further comprising deleting all instances of the PUF value and the multi-factor authentication value within the hardware device after seeding the cryptographic function.

17. The method of claim 14, wherein storing the cryptographic key associated with the identifier comprises storing the cryptographic key associated with an identifier of the hardware device as a user-device fingerprint in a user-device fingerprint list for future use by the challenger to authenticate the hardware device using the cryptographic challenge and response, and wherein the user-device fingerprint list is external to the hardware device.

18. The method of claim 17, further comprising certifying the user-device fingerprint list with a certifying authority.

19. The method of claim 14 further comprising combining the multi-factor authentication value with a third authentication factor representing something the user knows to generate a second multi-factor authentication value, wherein the second multi-factor authentication value seeds the cryptographic function.

20. The method of claim 14 further comprising combining a third authentication factor representing something the user knows with biometric data to generated the second authentication factor, wherein the biometric data is generated from the biometric of the user.

21. The method of claim 14 further comprising:
combining the multi-factor authentication value with a third authentication factor representing something the user knows to generate a second multi-factor authentication value; and
challenging a second PUF circuit disposed within the hardware device with the second multi-factor authentication to generate a third multi-factor authentication value for said seeding the cryptographic function.

22. A method for enrolling a user of a hardware device for subsequent authentication, the method comprising:
  challenging a physically unclonable function ("PUF") circuit with a second authentication factor representing a biometric of a user, wherein the biometric of the user is measured by a biometric reader of the hardware device and the PUF circuit is coupled to receive the second authentication factor as a challenge, and wherein the PUF circuit is disposed within the hardware device;
  generating a PUF value in response to being challenged with the second authentication factor; wherein the PUF value is a first authentication factor representing something the user has;
  generating helper data using the PUF value; and
  storing the helper data for future use to recover the PUF value during for a cryptographic challenge and response.

23. The method of claim 22, further comprising:
  seeding a cryptographic function based on the PUF value;
  generating a cryptographic key from the cryptographic function; and
  storing the cryptographic key of the hardware device for future use by a challenger to authenticate the user of the hardware device using the cryptographic challenge and response.

24. The method of claim 22, wherein said generating the helper data comprises:
  combining an error correcting codeword with a second portion of the PUF value to generate a first value, wherein the error correcting codeword is based upon a first portion of the PUF value;
  combining the first value and the second authentication factor to generate the helper data; and
  generating a seed value for seeding the cryptographic function based on the second portion of the PUF value.

25. The method of claim 22, further comprising deleting all instances of the PUF value and the second authentication factor within the hardware device after generating the helper data.

26. A method for cryptographically authenticating a user of a hardware device, the method comprising:
  retrieving a device identifier of the hardware device;
  using the device identifier to retrieve a user-device fingerprint for the hardware device, the user-device fingerprint including a cryptographic key, wherein the user-device fingerprint is based upon a multi-factor authentication value based on a physically unclonable function ("PUF") value generated in response to challenging a PUF circuit of the hardware device with a second authentication factor representing a biometric of a user, wherein the biometric of the user is measured by a biometric reader of the hardware device and the PUF circuit is coupled to receive the second authentication factor as a challenge, and wherein the PUF value is a first authentication factor representing something the user has; and
  authenticating the user of the hardware device using the cryptographic key.

27. The method of claim 26, wherein the multi-factor authentication value is generated in real-time each time the hardware device is challenged.

28. The method of claim 26, wherein the cryptographic key is a public key of a public-private key pair, and wherein said authenticating the user comprises:
  encrypting a message with the public key to generate an encrypted message;
  challenging the hardware device to decrypt the encrypted message; and
  determining whether the user is authenticated based upon whether the hardware device is able to decrypt the encrypted message.

* * * * *